(12) United States Patent
Hsia et al.

(10) Patent No.: US 12,717,080 B2
(45) Date of Patent: Aug. 25, 2026

(54) SIGNAL COMMUNICATION THROUGH OPTICAL-ENGINE BASED INTERCONNECT COMPONENT

(71) Applicant: Taiwan Semiconductor Manufacturing Co., Ltd., Hsinchu (TW)

(72) Inventors: Hsing-Kuo Hsia, Jhubei City (TW); Chen-Hua Yu, Hsinchu (TW); Chih-Wei Tseng, Hsinchu (TW); Jui Lin Chao, New Taipei City (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 551 days.

(21) Appl. No.: 18/151,033

(22) Filed: Jan. 6, 2023

(65) Prior Publication Data

US 2024/0085621 A1 Mar. 14, 2024

Related U.S. Application Data

(60) Provisional application No. 63/377,376, filed on Sep. 28, 2022, provisional application No. 63/375,590, filed on Sep. 14, 2022.

(51) Int. Cl.
*G02B 6/12* (2006.01)
*G02B 6/13* (2006.01)

(52) U.S. Cl.
CPC .......... *G02B 6/12004* (2013.01); *G02B 6/13* (2013.01); *G02B 2006/12121* (2013.01)

(58) Field of Classification Search
CPC ........ G02B 6/12004; G02B 6/13; G02B 6/43; G02B 6/42; G02B 6/4201; G02B 6/4202;
(Continued)

(56) References Cited

U.S. PATENT DOCUMENTS 6,690,845 B1 * 2/2004 Yoshimura ............ G02B 6/124 257/E25.032
8,855,452 B2 10/2014 Andry et al.
(Continued)

FOREIGN PATENT DOCUMENTS

CN 103217740 A 7/2013
CN 211530225 U * 9/2020 ............ H05K 1/185
(Continued)

OTHER PUBLICATIONS

CN_114624813_A (English translation) (Year: 2022).*
CN_211530225_U (English translation) (Year: 2020).*
WO_2022041159_A1 (English Translation) (Year: 2022).*

*Primary Examiner* — Thomas A Hollweg
*Assistant Examiner* — Mary A El-Shammaa
(74) *Attorney, Agent, or Firm* — Slater Matsil, LLP

(57) ABSTRACT

A method includes encapsulating a first device die and a second device die in an encapsulant, and forming an interconnect structure over and electrically connecting to the first device die and the second device die. A waveguide is formed in the interconnect structure. An optical-engine based interconnect component is bonded to the interconnect structure. The optical-engine based interconnect component forms a part of a signal path that connects the first device die to the second device die.

20 Claims, 44 Drawing Sheets

(58) Field of Classification Search
CPC .. G02B 6/4251; G02B 6/4253; G02B 6/4255; G02B 2006/12121; G02B 2006/12085
See application file for complete search history.

(56) References Cited

U.S. PATENT DOCUMENTS 11,715,728 B2 8/2023 Yu et al.
12,135,454 B2 11/2024 Yu et al.
2002/0097962 A1* 7/2002 Yoshimura ............. G02B 6/124 385/16
2019/0137706 A1* 5/2019 Xie ...................... H10H 20/853
2021/0096310 A1* 4/2021 Chang ..................... H01L 24/19
2022/0291461 A1* 9/2022 Elsinger ............. G02B 6/12004
2022/0365274 A1* 11/2022 Huang ..................... G02B 6/13
2022/0404551 A1* 12/2022 Tadayon .............. H05K 1/0274
2023/0012157 A1* 1/2023 Yu ...................... G02B 6/12002
2023/0080454 A1* 3/2023 Pietambaram ....... G02B 6/4274 385/14
2023/0087809 A1* 3/2023 Li ........................... G02B 6/32 385/33
2023/0088009 A1* 3/2023 Karhade .............. G02B 6/4243 385/14
2023/0089494 A1* 3/2023 Li .......................... G02B 6/428 385/14
2023/0185033 A1* 6/2023 Darmawikarta ..... G02B 6/4239 385/14
2023/0244043 A1* 8/2023 Yu ......................... H10F 39/199 385/33
2023/0384543 A1* 11/2023 Hsia ..................... G02B 6/4204
2023/0411369 A1* 12/2023 Karhade ............... H01L 25/167
2023/0417993 A1* 12/2023 Tsai ....................... G02B 6/124
2024/0030147 A1* 1/2024 Duan .................... H01L 21/486
2024/0385367 A1 11/2024 Yu et al.
2025/0216636 A1* 7/2025 Adivarahan ......... G02B 6/4215

FOREIGN PATENT DOCUMENTS

CN 112530925 A 3/2021
CN 114624813 A * 6/2022 ............... G02B 6/14
CN 114883202 A 8/2022
CN 115248477 A 10/2022
CN 118555841 A 8/2024
WO WO-2019132958 A1 * 7/2019 ............. H01L 24/92
WO WO-2022041159 A1 * 3/2022 ............. H01L 25/50

* cited by examiner 44
46
40
42
34
50
38
48
28
30
22
20B
20A
36
32

44
46
40
42
32
34
50
38
48
28
30
22
54
52
53
53
36

44
46
40
42
104
50
38
48
34
28
30
22
36
32

44 46 40 42 128 160 148A

50

38 162' 48 34 28 30 22 20B 20A 36 32

SIGNAL COMMUNICATION THROUGH OPTICAL-ENGINE BASED INTERCONNECT COMPONENT

PRIORITY CLAIM AND CROSS-REFERENCE

This application claims the benefit of the following provisionally filed U.S. Patent applications: Application No. 63/377,376, filed on Sep. 28, 2022, and entitled "Semiconductor Package," and Application No. 63/375,590, filed on Sep. 14, 2022, and entitled "GPU Cluster Connection realized by COUPE-based Optical Interconnect," which applications are hereby incorporated herein by reference.

BACKGROUND

Integrated circuits are having increasingly more functions. In order to integrate more functions together, a plurality of device dies are manufactured, and are packaged together in a packaging process(es). The plurality of device dies are electrically interconnected in order to work together. Signals are transferred between the device dies and packages to implement the intercommunication.

With the increasingly demanding requirement of high-performance applications, there is increasingly higher demand of the communication speed and bandwidth between the device dies and packages. The communication speed and bandwidth of copper wires, which are often used for the signal communication between the device dies and packages, however, are known as being low. Furthermore, the cross-talk and interference between the copper wires are high. Hence, the performance and bandwidth of the communication between the device dies and packages are limited.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
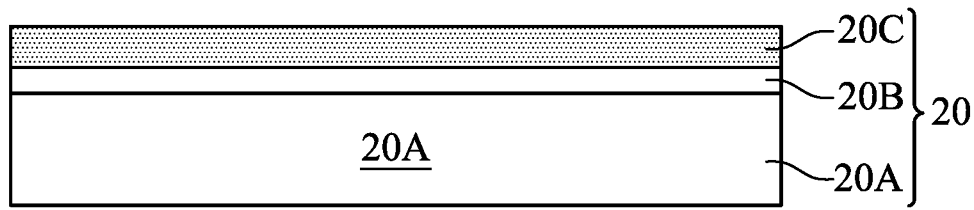
FIGS. 1-12, 13A, 13B, 14, 15A, 15B, 16A, 16B, 17A, 17B, and 18-22 illustrate the intermediate stages in the formation of a package in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A package and the method of forming the same are provided. In accordance with some embodiments of the present disclosure, an optical-engine based interconnect component is formed, and is used for signal communication between package components in a high-performance package. The optical-engine based interconnect component may include a photonic die and an electronic die bonded to each other. The optical-engine based interconnect component converts electrical signals in a first package component to optical signals, which are transferred toward a second package component. The optical signals are converted back to the electrical signals before providing to the second package component. By using the optical-engine based interconnect component to transfer electrical signals, rather than using metal lines, the bandwidth of signal communication between the package components is high, and cross-talk and interference are low.

The Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

Figure 70:
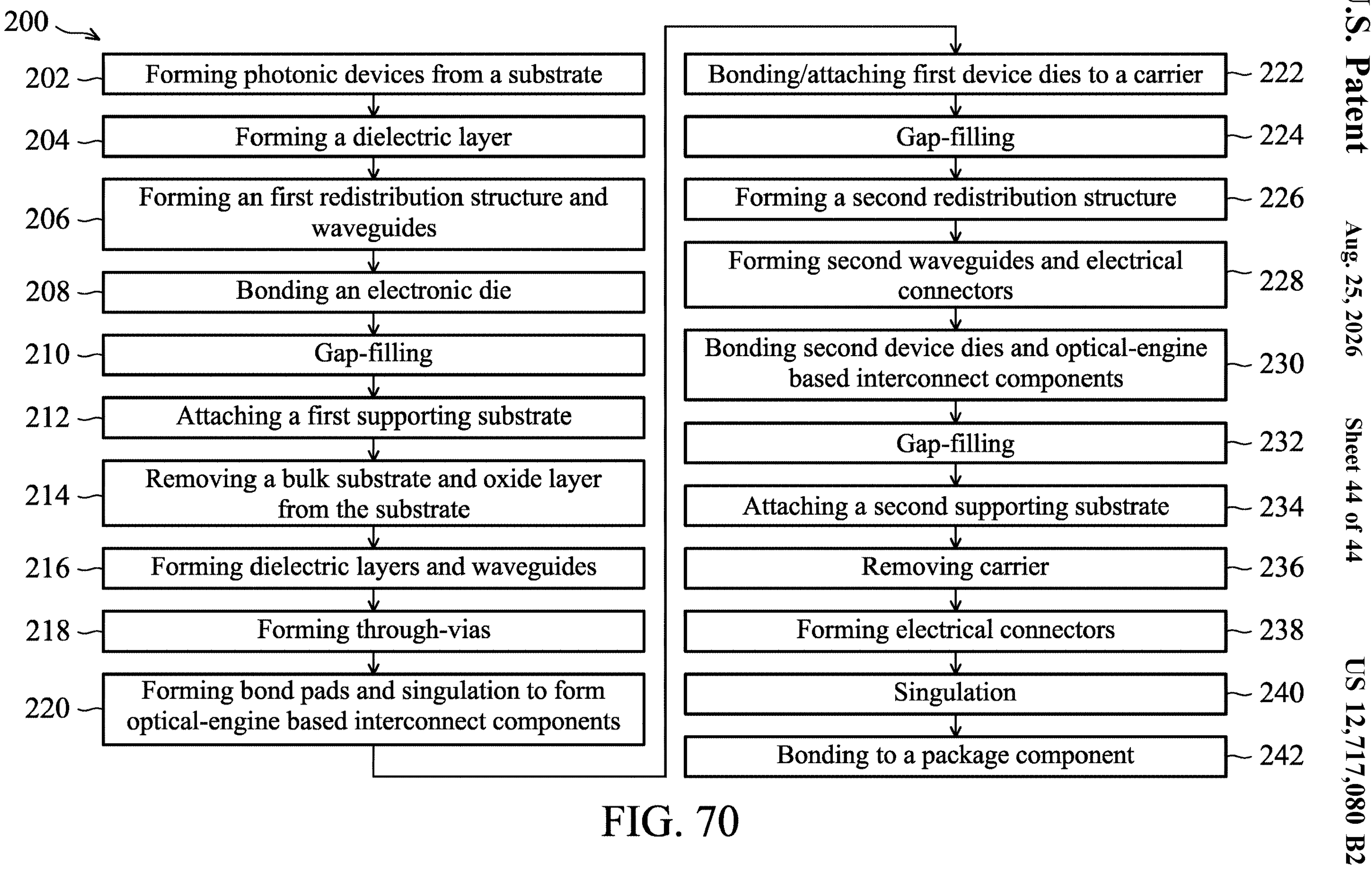
FIG. 70 illustrates a process flow for forming a package in accordance with some embodiments.

FIGS. 1-12, 13A, 13B, 14, 15A, 15B, 16A, 16B, 17A, 17B, and 18-22 illustrate the cross-sectional views and top views of intermediate stages in the formation of a package in accordance with some embodiments of the present disclosure. The corresponding processes are also reflected schematically in the process flow 200 as shown in FIG. 70.

FIGS. 1 through 12 illustrate the formation of an optical-engine based interconnect component in accordance with some embodiments. Referring to FIG. 1, substrate 20 is provided. In accordance with some embodiments, substrate 20 is a Silicon-on-Insulator (SOI) substrate including semiconductor layer 20A, dielectric layer 20B over semiconductor layer 20A, and photonic layer 20C over dielectric layer 20B. Each of semiconductor layer 20A, dielectric layer 20B, and photonic layer 20C is a blanket layer. In accordance with some embodiments, semiconductor layer 20A includes a semiconductor substrate such as a silicon substrate. Semiconductor layer 20A may have a single-crystalline structure. Dielectric layer 20B may be formed of or comprise a silicon oxide layer, or may be formed of other dielectric materials (such as silicon oxynitride) that are transparent to light. In accordance with some embodiments, photonic layer 20C is formed of or comprises silicon. In accordance with alternative embodiments, photonic layer 20C is formed of or comprises a III-V compound semiconductor material, lithium niobate, a polymer, or the like. Photonic layer 20C is referred to as silicon layer 20C hereinafter, while it may also be formed of other materials, as aforementioned.

Dielectric layer 20B may have a thickness in the range between about 0.5 μm and about 4 μm. Silicon layer 20C may have a thickness in the range between about 0.1 μm and about 1.5 μm. Substrate 20 may be referred to as having a front side or front surface (e.g., the side facing upwards in FIG. 1), and a backside or back surface (e.g., the side facing downwards in FIG. 1). The front side of the substrate 20 is also referred to as the front side of the resulting photonic wafer and photonic die.

Figure 2:
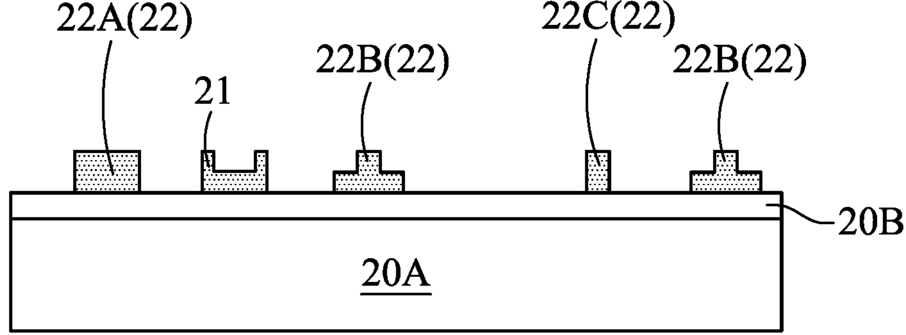

In FIG. 2, silicon layer 20C is patterned to form a plurality of photonic devices 22, which are alternatively referred to as optical devices or silicon devices. The respective process is illustrated as process 202 in the process flow 200 as shown in FIG. 70. Silicon layer 20C may be patterned using suitable photolithography and etching techniques, which may involve etching processes using photoresists to define patterns.

Some examples of the photonic devices 22 include waveguides 22A, slab waveguides 22B, tip waveguides 22C, grating couplers (not shown), photodetectors (not shown), and/or the like. Tip waveguides 22C may also be formed, which are narrow waveguides, for example, having widths in the range between about 1 nm and about 200 nm. A photodetector may be optically coupled to one of the waveguides 22A to detect optical signals within the waveguide and generate electrical signals corresponding to the optical signals. In accordance with other embodiments, photonic devices 22 may include other active or passive components, such as laser diodes, optical signal splitters, or other types of photonic structures or devices. Silicon component 21 may also be formed, and may have a U-shaped cross-sectional shape with a recess therein.

Figure 3:
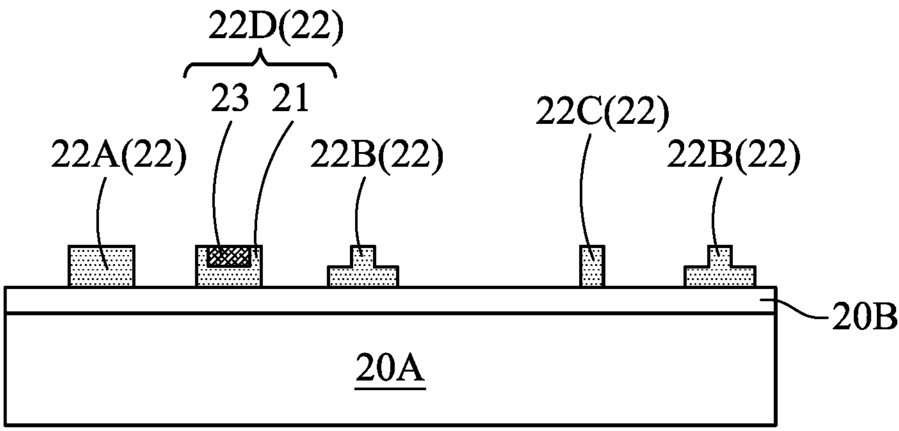

FIG. 3 illustrates the formation of germanium modulator 22D as an example of modulators. The formation process may include filling germanium region 23 into the recess in silicon component 21. Modulators such as germanium modulator 22D may be used for electrical-to-optical signal modulation and transversion. The modulators may receive electrical signals and modulate optical power within a waveguide to generate corresponding optical signals. In this manner, photonic devices 22 may input optical signals from, or output optical signal to, waveguides.

Figure 4:
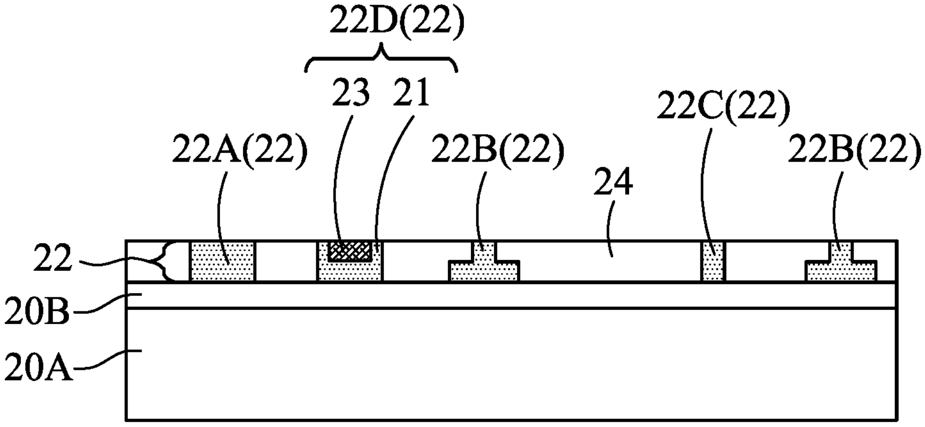

Referring to FIG. 4, dielectric layer 24 is formed. The respective process is illustrated as process 204 in the process flow 200 as shown in FIG. 70. The formation process may include depositing a dielectric layer, and performing a planarization process such as a Chemical Mechanical Polish (CMP) process or a mechanical grinding process. Accordingly, the top surfaces of photonic devices 22 are coplanar with the top surface of dielectric layer 24. Dielectric layer 24 may be formed of or comprise an oxide such as silicon oxide in accordance with some embodiments, while other dielectric materials that are also transparent to light may also be used.

Figure 5:
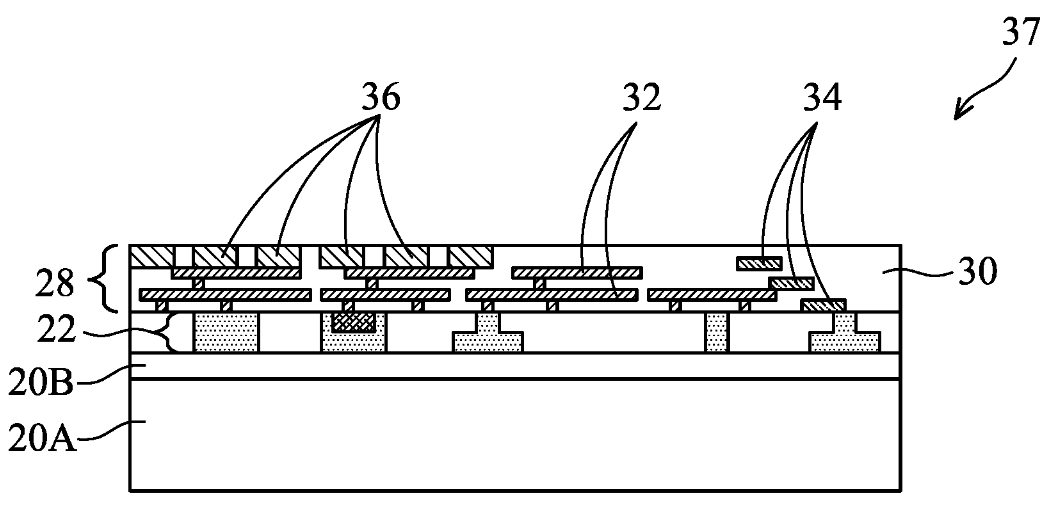

Referring to FIG. 5, redistribution structure 28 is formed over dielectric layer 24. The respective process is illustrated as process 206 in the process flow 200 as shown in FIG. 70. Redistribution structure 28 includes dielectric layers 30 and conductive features 32 formed in dielectric layers 30. Conductive features 32 provide electrical interconnections and electrical routing. Conductive features 32 are electrically connected to modulators, photodetectors, and or the like. Dielectric layers 30 may be, for example, insulating layers and/or passivating layers, and may comprise silicon oxide, silicon nitride, or the like. Dielectric layers 30 may be transparent to light, or may be opaque if no optical signal is to be passed through them. Dielectric layers 30 may be formed through a damascene process. Conductive pads 36 are formed in the topmost layer of dielectric layers 30.

In dielectric layers 30, waveguides 34 may also be formed. The respective process is also illustrated as process 206 in the process flow 200 as shown in FIG. 70. In accordance with some embodiments, waveguides 34 are formed of silicon nitride, and hence are referred to as nitride waveguide 34 hereinafter. Nitride waveguides 34, although the name, may also include other photonic structures such as grating couplers and edge couplers, that allow optical signals to be transmitted or processed. Silicon nitride has a higher dielectric constant than silicon, and thus a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness). Throughout the description, the structure shown in FIG. 5 is referred to as Photonic Integrated Circuit (PIC) wafer 37.

Figure 6:
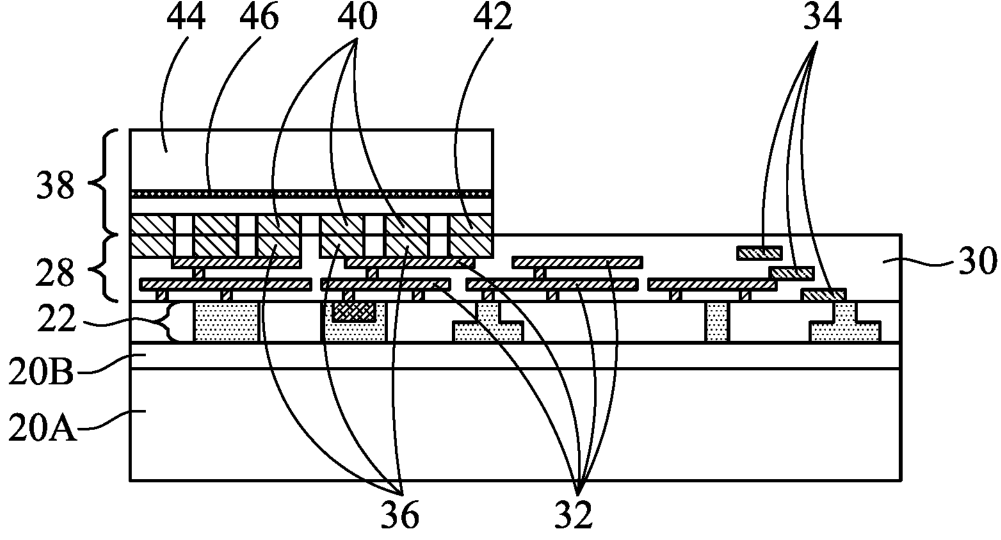

Referring to FIG. 6, electronic die 38 is bonded to redistribution structure 28. The respective process is illustrated as process 208 in the process flow 200 as shown in FIG. 70. Electronic die 38 may also be referred to as an Electronic Integrated Circuit (EIC) die. Although one electronic die 38 is illustrated, a plurality of electronic dies 38 that are identical to each other may be bonded to interconnect structure 28. Electronic dies 38 may include, for example, semiconductor devices, dies, or chips that communicate with photonic devices 22 using electrical signals. Electronic die 38 includes semiconductor substrate 44, integrated circuits 46 (schematically illustrated), electrical connectors 40, which may be in surface dielectric layer 42. Electrical connectors 40 may include, for example, conductive pads, conductive pillars, or the like.

In accordance with some embodiments, electronic die 38 is bonded to redistribution structure 28 through hybrid bonding (which includes both of dielectric-to-dielectric bonding and metal-to-metal bonding), direct metal-to-metal bonding, solder bonding, or the like. For example, when hybrid bonding is adopted, surface dielectric layer 42 in electronic die 38 may be bonded to the top surface dielectric layer 30 in interconnect structure 28 through fusion bonding, while electric connectors 40 in electronic die 38 may be bonded to conductive pads 36 through metal-to-metal direct bonding. Conductive pads 36 are thus alternatively referred to as bond pads 36 hereinafter.

Integrated circuits 46 have the function of interfacing with photonic devices 22, and may include the circuits for controlling the operation of photonic devices 22. For example, integrated circuits 46 may include controllers, drivers, amplifiers, the like, or combinations thereof. Electronic die 38 may also include a Central Processing Unit (CPU). In accordance with some embodiments, integrated circuits 46 include the circuits for processing electrical signals received from photonic devices 22. Electronic die 38 may also control high-frequency signaling of photonic devices 22 according to the electrical signals (digital or analog) received from another device or die. In accordance with some embodiments, electronic die 38 may provide Serializer/Deserializer (SerDes) functionality, so that electronic die 38 may act as a part of an I/O interface between optical signals and electrical signals.

Figures 7, 8:
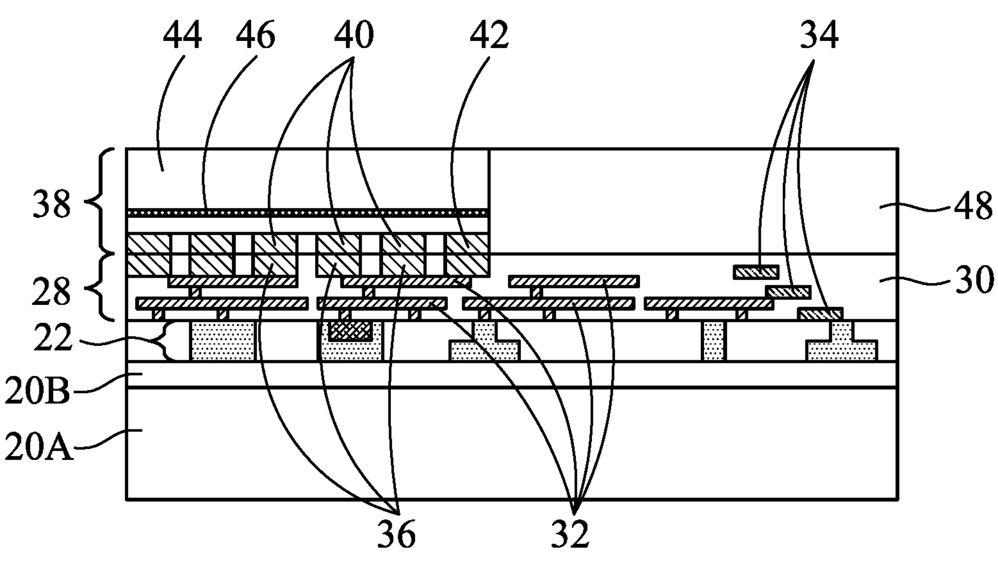

Referring to FIG. 7, gap-filling material 48 is formed over electronic die 38 and redistribution structure 28. The respective process is illustrated as process 210 in the process flow 200 as shown in FIG. 70. Gap-filling material 48 may be formed of or comprise silicon oxide, silicon nitride, a polymer, the like, or a combination thereof. Gap-filling material 48 may be formed through Chemical Vapor Deposition (CVD), Physical Vapor Deposition (PVD), Atomic Layer Deposition (ALD), spin-on coating, Flowable Chemical Vapor Deposition (FCVD), or the like. Gap-filling material 48 may be a material (e.g., silicon oxide) that is transparent to light at wavelengths suitable for transmitting optical signals or optical power therein. In accordance with some embodiments in which light is not to be projected upwardly or downwardly through gap-filling material 48, gap-filling material 48 may comprise a relatively opaque material such as an encapsulant, molding compound, or the like. Gap-filling material 48 may be planarized using a planarization process such as a Chemical Mechanical Polish (CMP) process, a mechanical grinding process, or the like. In accordance with some embodiments, the planarization process may expose electronic die 38, with the top surfaces of electronic die 38 and gap-filling material 48 being coplanar.

FIG. 8 illustrates the attachment of supporting substrate 50. The respective process is illustrated as process 212 in the process flow 200 as shown in FIG. 70. In accordance with some embodiments, supporting substrate 50 is or comprises a silicon substrate. A silicon-containing dielectric layer (not shown), which may comprise silicon oxide, silicon oxynitride, silicon carbo-nitride, or the like, may be used to bond supporting substrate 50 to the semiconductor substrate of electronic die 38. Alternatively, supporting substrate 50 physically contacts, and is bonded to, electronic die 38 and gap-filling material 48. The bonding may be performed through fusion bonding, with Si—O—Si bonds formed.

Figures 9, 10:
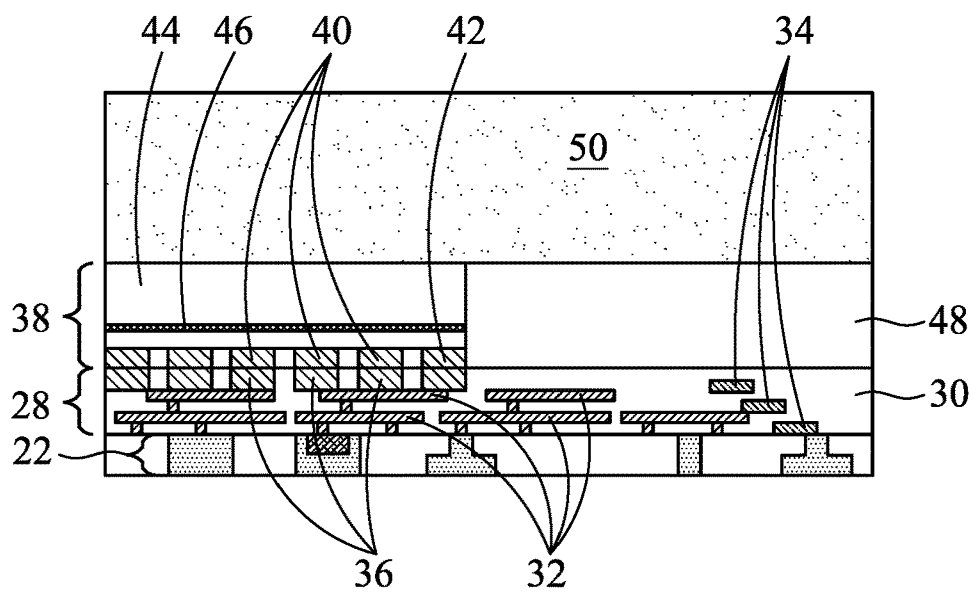

Next, semiconductor layer 20A may be removed. The respective process is illustrated as process 214 in the process flow 200 as shown in FIG. 70. The resulting structure is shown in FIG. 9. Semiconductor layer 20A may be removed using a planarization process (e.g., a CMP process or a mechanical grinding process), an etching process, a combination thereof, or the like. In accordance with some embodiments, dielectric layer 20B is also removed, so that the bottom surfaces of dielectric layer 24 and photonic devices 22 are revealed.

In subsequent processes, as shown in FIG. 10, dielectric layers 54 are formed, with nitride waveguides 52 being formed therein. The respective process is illustrated as process 216 in the process flow 200 as shown in FIG. 70. The formation of nitride waveguides 52 may include a deposition process, followed by a patterning process through etching. The deposition process may include CVD, PECVD, Low-Pressure Chemical Vapor Deposition (LPCVD), PVD, or the like. Nitride waveguides 52 may be formed of or comprise silicon nitride, silicon oxynitride, or the like. Alternatively, instead of forming nitride waveguides 52, polymer waveguides may be formed.

Dielectric layers 54 may be formed of or comprise a light-transparent material(s) such as silicon oxide, a spin-on glass, or the like. Dielectric layers 54 may be formed using CVD, PVD, spin-on coating, or the like, while another process may be used. In accordance with some embodiments, a planarization process such as a CMP process or a mechanical grinding process is used to remove excess material of each of dielectric layers 54. After the planarization, dielectric layers 54 may have a surface (the illustrated bottom surface) coplanar with a surface of the corresponding nitride waveguides 52. Alternatively, dielectric layers 54 may be thicker than the corresponding nitride waveguides 52, so that after the planarization process, the nitride waveguides 52 are embedded in the corresponding dielectric layer 54. Nitride waveguides 52 may be optically coupled to photonic devices 22 through light projection and/or through Evanescent coupling. Nitride waveguides 52 may also be optically inter-coupled through Evanescent coupling. In the Evanescent coupling, when two waveguides 52 are parallel and adjacent to each other, the light in one of the waveguides 52 (for example, the part in region 53) will gradually reduce in intensity along its extending direction, and gradually coupled into the other waveguide.

Figure 11:
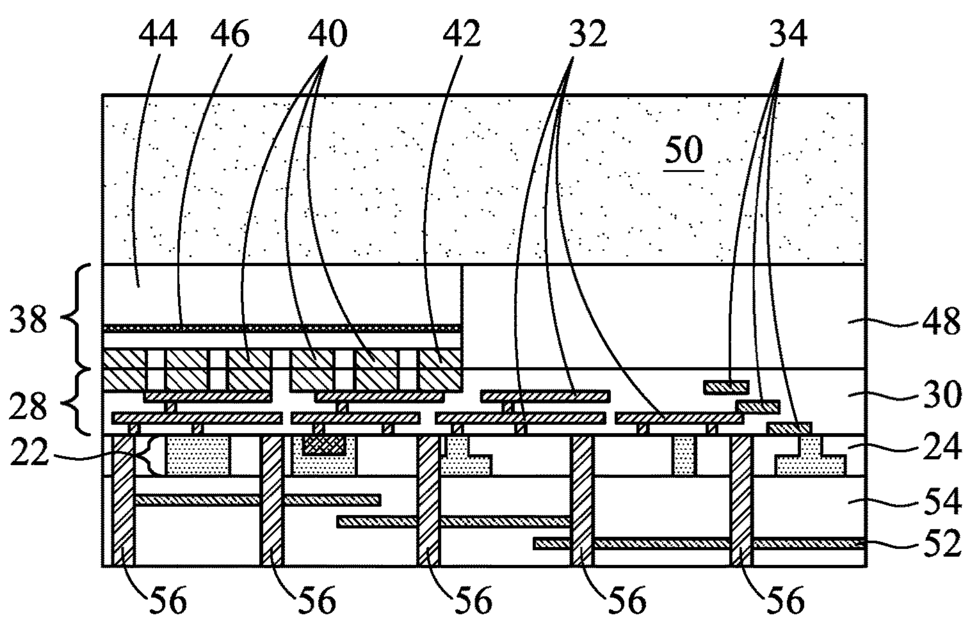

Referring to FIG. 11, (electrical conductive) through-vias 56 are formed to penetrate through dielectric layers 54 and dielectric layer 24, and electrically connect to conductive features 32 in interconnect structure 28. The respective process is illustrated as process 218 in the process flow 200 as shown in FIG. 70. The formation process may include etching-through layers 54 and dielectric layer 24 to form via openings, and to reveal conductive features 32, filling the via openings with conductive materials (such as TiN, TaN, Ti, Ta, Cu, W, Co, or the like), and performing a planarization process. There may be, or may not be, a dielectric liner formed encircling through-vias 56.

Figure 12:
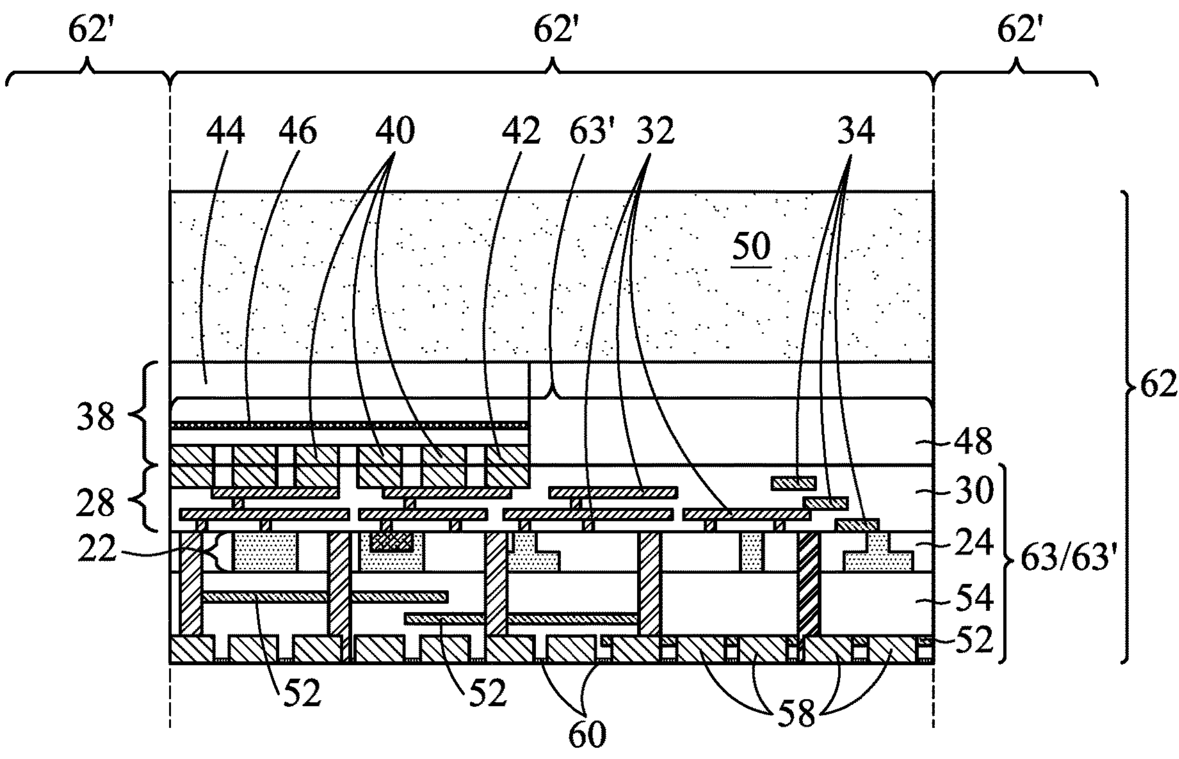

Referring to FIG. 12, bond pads 58 are also formed, and may be formed in an additional dielectric layer 60. The respective process is illustrated as process 220 in the process flow 200 as shown in FIG. 70. Dielectric layer 60 may be formed of a material similar to the materials of dielectric layers 54. The structure shown in FIG. 12, which structure is a reconstructed wafer, is referred to as reconstructed wafer 62. Reconstructed wafer 62 includes photonic wafer 63 and a plurality of electronic dies 38 therein.

In a subsequent process, a singulation process is performed to saw reconstructed wafer 62 into a plurality of optical-engine based interconnect components 62', which have structures identical to each other. The respective process is also illustrated as process 220 in the process flow 200 as shown in FIG. 70. Optical-engine based interconnect component 62' includes photonic die (PIC) 63' and electronic die (EIC) 38 therein. Optical-engine based interconnect components 62' have the function of transferring electrical signals by using optical engines, so that the transferring speed and bandwidth are improved, while cross-talk and interference are reduced. The detailed operation of optical-engine based interconnect components 62' are described in subsequent paragraphs referring to FIG. 69.

Figure 13A:
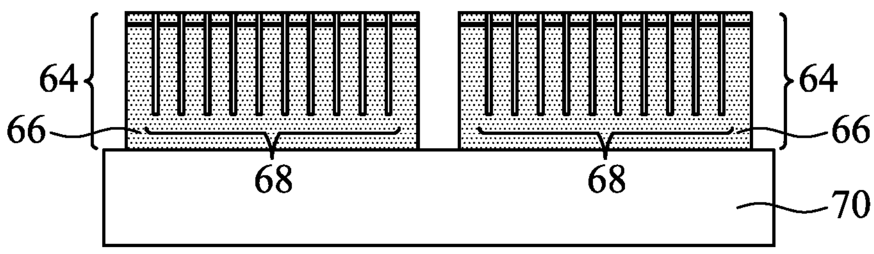
Figure 13B:
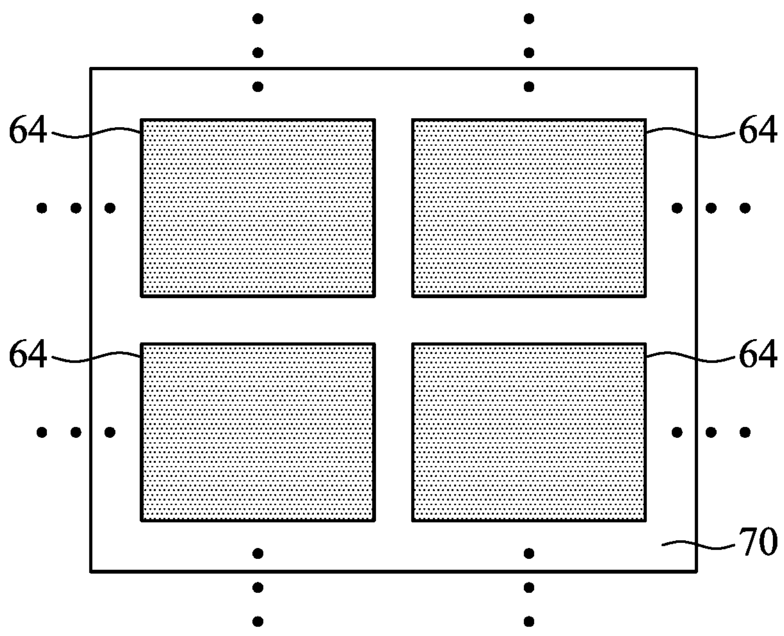

FIGS. 13A, 13B, 14, 15A, 15B, 16A, 16B, 17A, 17B, and 18-22 illustrate the intermediate stages in the formation of a package incorporating optical-engine based interconnect components 62' in accordance with some embodiments. Referring to FIGS. 13A and 13B, which illustrate a cross-sectional view and a top view, respectively, device dies 64 are bonded or attached to carrier 70. The respective process is illustrated as process 222 in the process flow 200 as shown in FIG. 70. In accordance with some embodiments, carrier 70 is a silicon wafer, which is bonded to device dies 64 through fusion bonding. In accordance with alternative embodiments, carrier 70 is a carrier wafer, and device dies 64 are attached to carrier 70 through a Light-To-Heat-Conversion (LTHC) material (not shown).

A device die 64 may be an Application-Specific-Integrated-Circuit (ASIC) die, which may be have any function depending on the usage of the resulting package. Through-vias 68 are formed, and extend into semiconductor substrate 66 (which may be a silicon substrate) in device die 64. The integrated circuits and the interconnect structure in device dies 64 are not shown in detail. As shown in FIG. 13B, there are a plurality of device dies 64, which may be identical to each other or different from each other. Device dies 64 may be arranged as an array.

Figure 14:
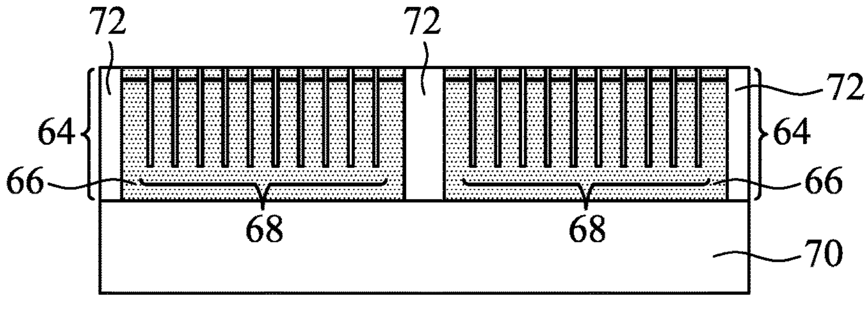

Referring to FIG. 14, gap-filling regions 72 are formed. The respective process is illustrated as process 224 in the process flow 200 as shown in FIG. 70. Gap-filling regions 72 are formed of a dielectric material(s), and may include, for example, a silicon nitride layer and an oxide layer over the silicon nitride layer. Alternatively, gap-filling regions 72 may be formed of or comprise a molding compound. A planarization process such as a CMP process or a mechanical grinding process may be performed to level the top surfaces of device dies 64 with the top surface of gap-filling regions 72.

Figure 15A:
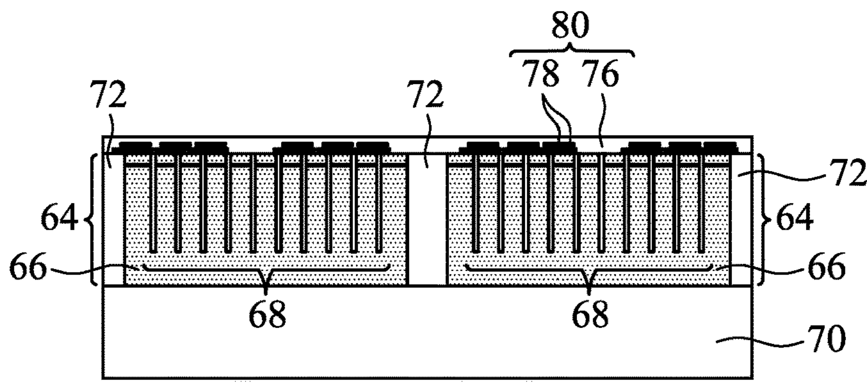
Figure 15B:
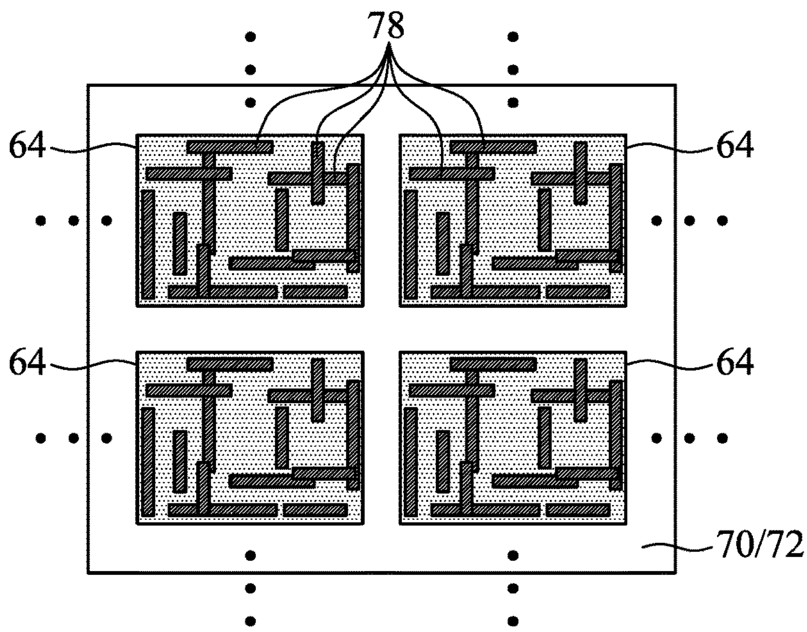

Referring to FIG. 15A, interconnect structure 80 is formed, which includes dielectric layers 76 and Redistribution Lines (RDLs) 78 therein. The respective process is illustrated as process 226 in the process flow 200 as shown in FIG. 70. Dielectric layers 76 may be formed of or comprise a polymer such as polyimide, PBO polybenzoxazole (PBO), benzocyclobutene (BCB), or the like, or an inorganic material such as silicon oxide. Dielectric layers 76 may be transparent to light. RDLs 78 may be formed of copper, nickel, titanium, or the like, or multi-layers thereof. FIG. 15B illustrates a top view with some example RDLs 78 illustrated.

Figure 16A:
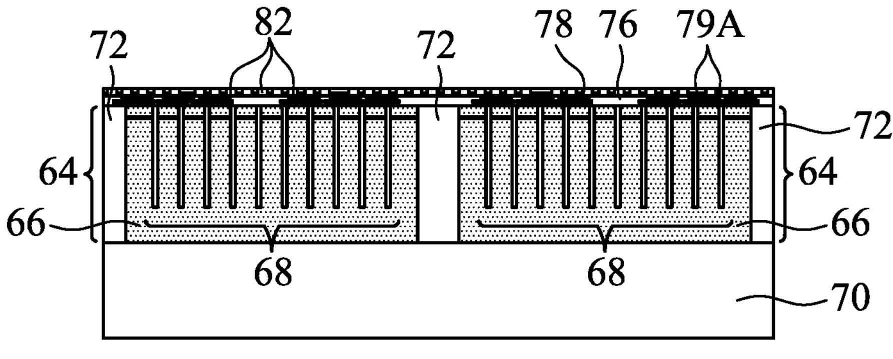
Figure 16B:
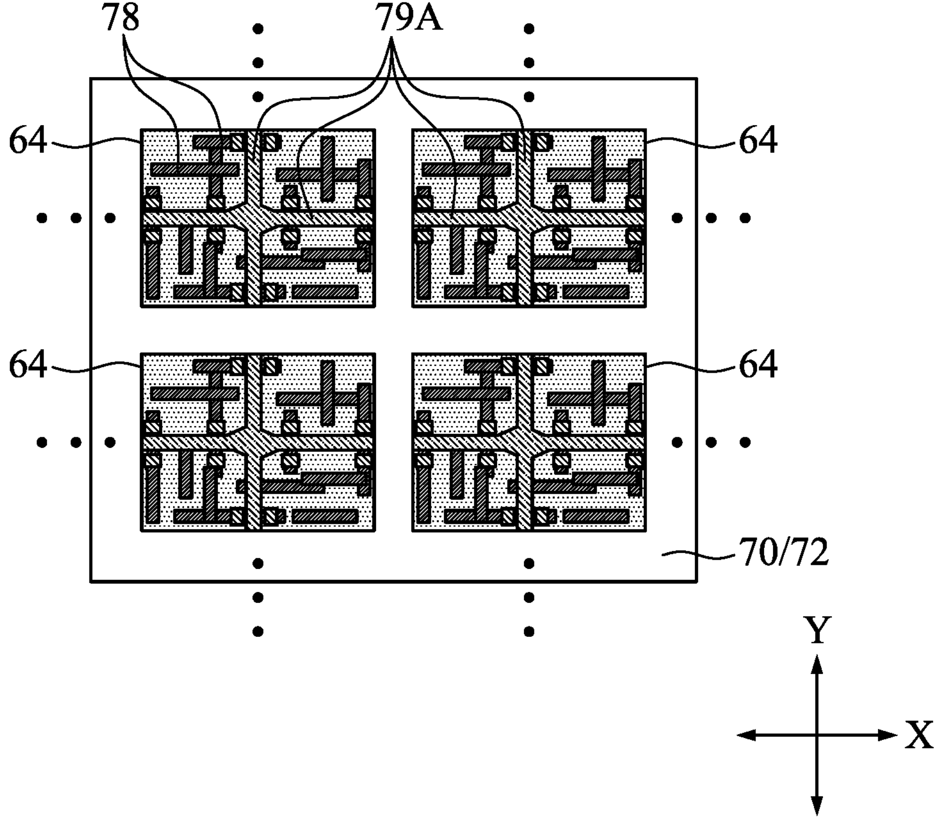

FIG. 16A further illustrates the formation of waveguides 79A in interconnect structure 80. The respective process is illustrated as process 228 in the process flow 200 as shown in FIG. 70. Waveguides 79A may be formed of or comprise silicon nitride, silicon oxynitride, a polymer, or the like. The formation process may include depositing a blanket layer over interconnect structure 80, and then performing a photo lithography process to pattern the blanket layer. FIG. 16B illustrates a top view of some example waveguides 79A. Waveguides 79A may include first portions extending in X-direction and second portions extending in Y-direction. The first portions may join with respective second portions, so that the optical signal running therein may be redistributed, and the waveguides 79A may be used as buses for signals. Waveguides 79A may also be optically (and hence signally) coupled to waveguides 34 and 52 (for example, FIG. 33A) in the resulting package.

As also shown in FIG. 16A, electrical connectors 82 are formed, which may comprise metal pads, solder regions, metal pillars, and/or the like. The respective process is also illustrated as process 228 in the process flow 200 as shown in FIG. 70.

Figure 17A:
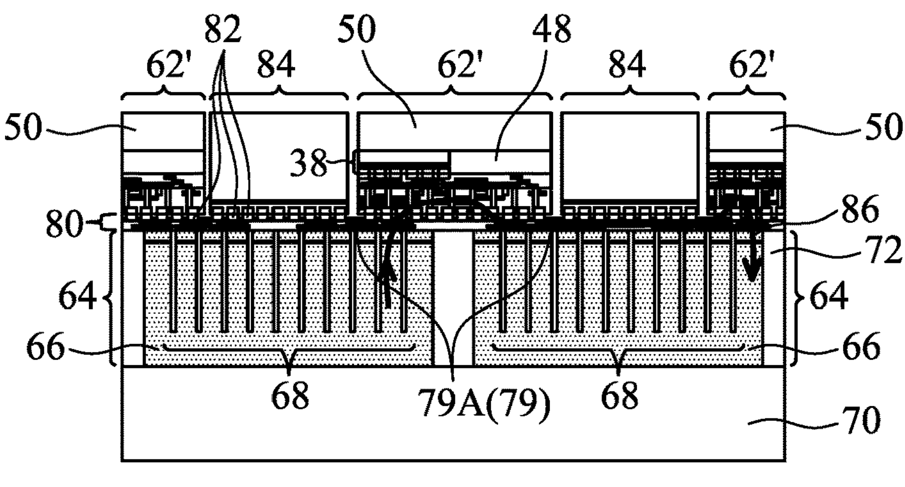
Figure 17B:
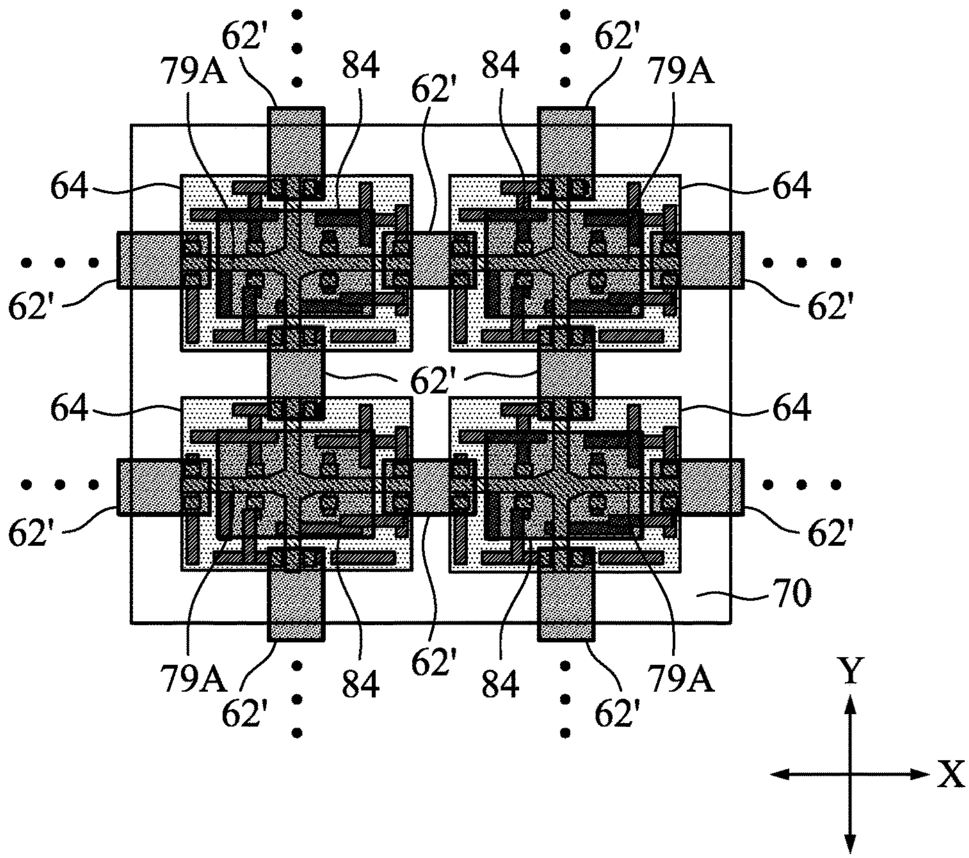

Referring to FIG. 17A, device dies 84 and optical-engine based interconnect components 62' are bonded to electrical connectors 82. The respective process is illustrated as process 230 in the process flow 200 as shown in FIG. 70. The bonding may be achieved through hybrid bonding, solder bonding, or the like. In accordance with some embodiments, device dies 84 comprise computing dies, which may include CPU dies, Graphic Processing Unit (GPU) dies, mobile application dies, Micro Control Unit (MCU) dies, BaseBand (BB) dies, Application processor (AP) dies, or the like.

Figure 69:
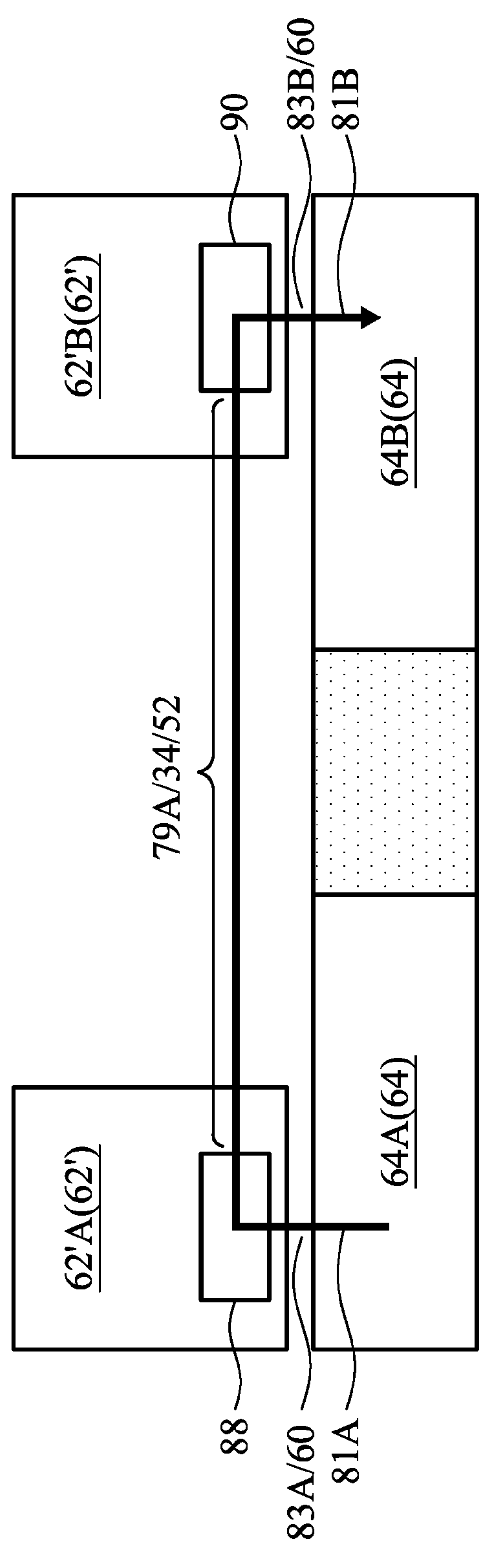
FIG. 69 illustrates a signal path including an optical-engine based interconnect component in accordance with some embodiments.

Each of optical-engine based interconnect components 62' may be electrically connected to two or more device dies 64 through interconnect structure 80, so that the optical-engine based interconnect component 62' may electrically interconnect at least two (or more such as four) neighboring device dies 64. Signals are transferred through the optical-engine based interconnect components 62'. For example, FIG. 69 schematically illustrates two optical-engine based interconnect components 62' (including 62'A and 62'B) electrically connected to two device dies 64 (marked as 64A and 64B). A signal path 86 is shown to interconnect device die 64A and 64B. Signal path 86 includes optical-engine based interconnect component 62'A and 62'B, and an optical path, which may include waveguide(s) 79A. The optical path may also include waveguides 34 and/or 52 inside optical-engine based interconnect component 62'A and 62'B. Waveguide(s) 79A, 34, and/or 52 may be optically inter-coupled to form the optical paths/buses.

In the example signal path 86, electrical signals 81A may be transferred from device die 64A into input node 83A (one of bond pads 58, FIG. 12, for example), and into optical-engine based interconnect component 62'A. Electrical signals 81A are converted into optical signals by electrical-to-optical converter 88, which may be a modulator such as modulator 22D (FIG. 3). The optical signal is then provided to waveguide 79A (also refer to FIGS. 16A and 16B) and transferred to optical-to-electrical converter 90 (FIG. 69). Optical-to-electrical converter 90 may include, for example, a photodetector such as a photo diode, which may be one of the photonic devices 22 as shown in FIG. 3. The optical signals are converted to electrical signals 81B, which are then transferred to output node 83B (one of bond pads 58, FIG. 12, for example), and sent to device die 64B. Electrical signals 81B are reproductions of, and are intended to be identical to, signals 81A. The function of signal path 86 is essentially the same as a signal path that is formed of metal, such as copper lines, except signal path 86 has a higher bandwidth than copper lines. Accordingly, a high-speed and high bandwidth signal path 86 is formed by adopting optical-engine based interconnect component 62'. An example signal path 86 is shown schematically in FIG. 17A also.

It is appreciated that the functions of optical-engine based interconnect components 62'A and 62'B may be achieved by a single optical-engine based interconnect component 62'. In which case, the illustrated optical-engine based interconnect components 62'A and 62'B are a same optical-engine based interconnect component. In accordance with alternative embodiments, signal path 86 includes more than two optical-engine based interconnect components, and the waveguides in between.

Referring back to FIG. 17B, a plurality of optical-engine based interconnect components 62' may be adopted, each between and signally connected to two waveguides 79A. Optical-engine based interconnect components 62' may form an array. Accordingly, a plurality of signal paths may be formed as a web (a grid). The plurality of optical-engine based interconnect component 62' also form signal paths extending in both of X-direction and Y-direction.

Figure 18:
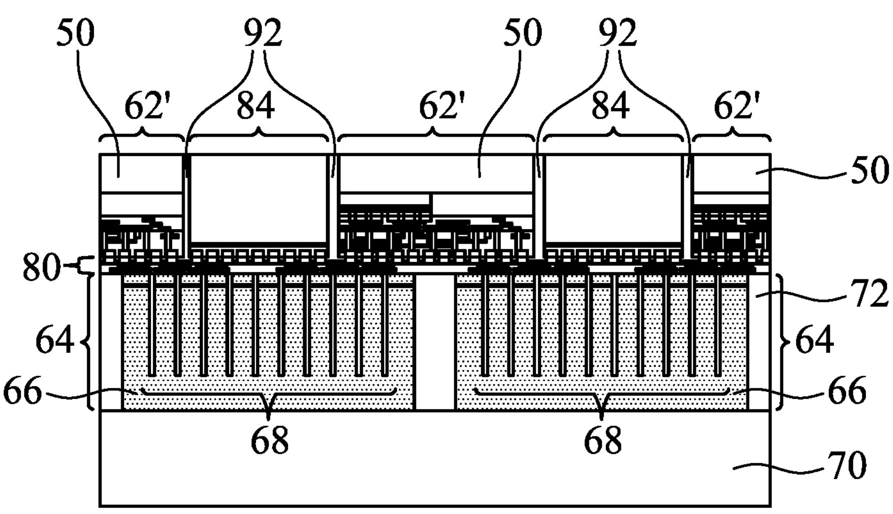

Referring to FIG. 18, gap-filling regions 92 are formed in the gaps between device dies 84 and optical-engine based interconnect components 62'. The respective process is illustrated as process 232 in the process flow 200 as shown in FIG. 70. The materials of gap-filling regions 92 may be selected from the same candidate materials for forming gap-filling regions 72, and may include, for example, silicon oxide, silicon nitride, and/or the like. The details are thus not repeated herein.

Figure 19:
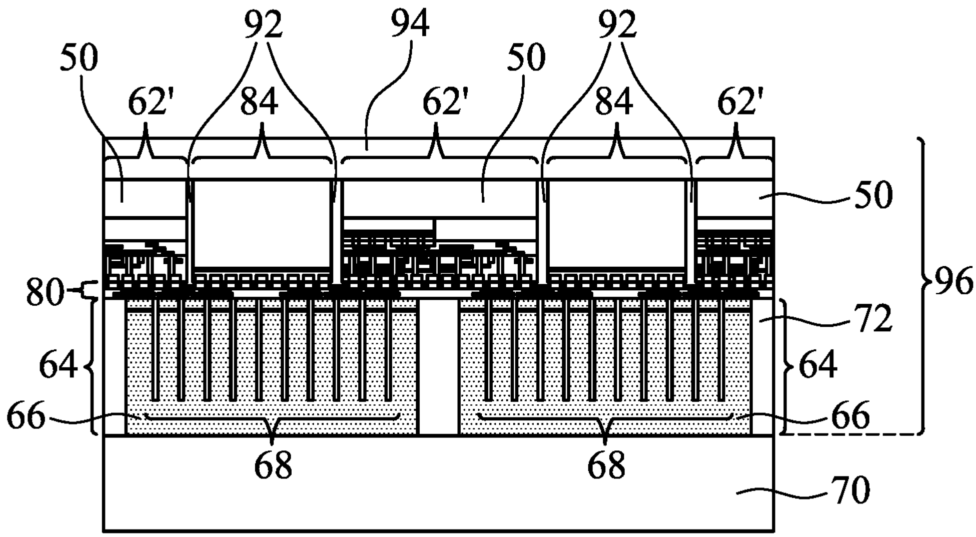

Referring to FIG. 19, supporting substrate 94 is bonded to the semiconductor substrates of device dies 84, supporting substrates 50 in optical-engine based interconnect components 62', and gap-filling regions 92. The respective process is illustrated as process 234 in the process flow 200 as shown in FIG. 70. In an example embodiment, a silicon-containing dielectric layer such as a silicon oxide layer, a silicon nitride layer, a silicon oxynitride layer, or the like may be formed on device dies 84, supporting substrates 50, and gap-filling regions 92. Supporting substrate 94 is then bonded to the silicon-containing dielectric layer through fusion bonding. Alternatively, supporting substrate 94 is in physical contact with supporting substrates 50 in optical-engine based interconnect components 62', and in physical contact with the semiconductor substrates of device dies 84. Supporting substrate 94 may be a silicon substrate in accordance with some embodiments. Throughout the description, the structure over carrier 70 is referred to as reconstructed wafer 96.

Figure 20:
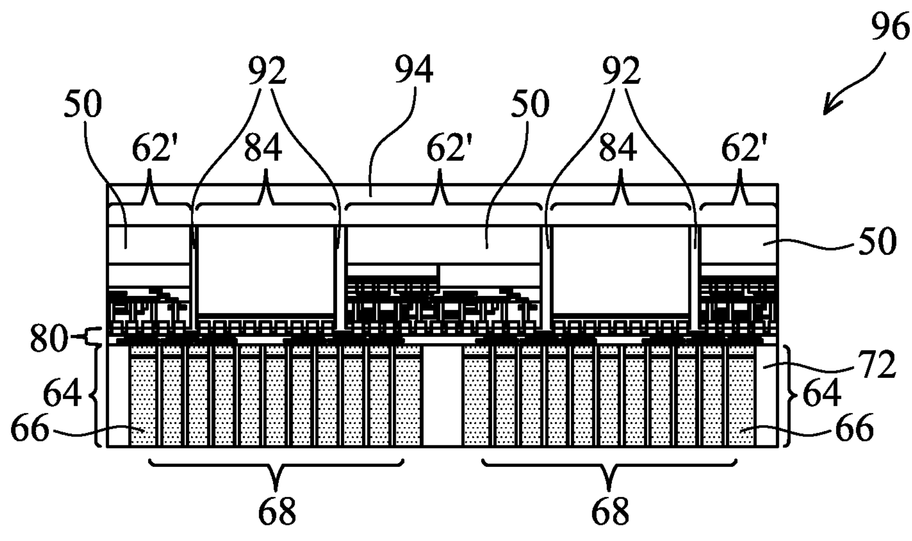

In a subsequent process, carrier 70 is removed from reconstructed wafer 96, for example, through grinding or a laser scanning process. The respective process is illustrated as process 236 in the process flow 200 as shown in FIG. 70. A backside grinding process is performed to grind semiconductor substrates 66 in device dies 64, revealing through-vias 68. The resulting structure is shown in FIG. 20.

Figure 21:
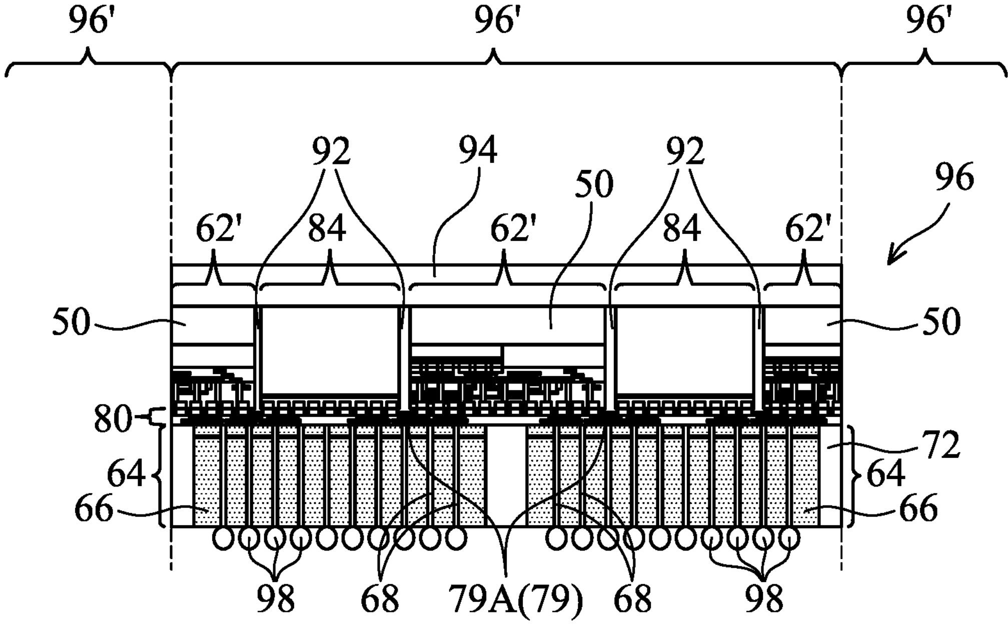

In a subsequent process, as shown in FIG. 21, electrical connectors 98 are formed on the backside of reconstructed wafer 96, and are electrically connected to through-vias 68. The respective process is illustrated as process 238 in the process flow 200 as shown in FIG. 70. There may be, or may not be, backside RDLs (not shown) formed on the backside of reconstructed wafer 96. The backside RDLs (if formed) electrically connect electrical connectors 98 to through-vias 68.

In accordance with some embodiments, a singulation process is preformed to saw reconstructed wafer 96 into a plurality of identical packages 96'. The respective process is illustrated as process 240 in the process flow 200 as shown in FIG. 70. Each of the identical packages 96' may include multiple device dies 64, multiple device dies 84, and multiple interconnect components 62'. The top view of a package 96' may be represented by FIG. 17B. In accordance with alternative embodiments, an entire reconstructed wafer 96 is used without being singulated into identical packages 96'.

Figure 22:
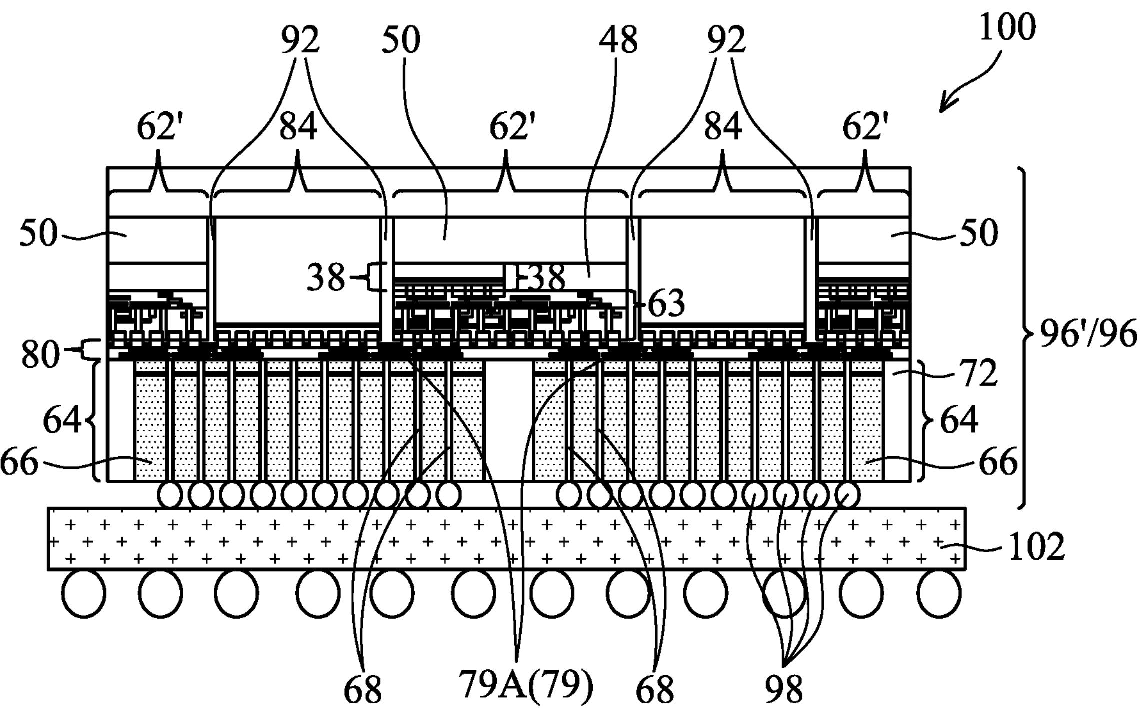

FIG. 22 illustrates the bonding of package 96' (or reconstructed wafer 96) to package component 102. The respective process is illustrated as process 242 in the process flow 200 as shown in FIG. 70. Package component 102 may be a package substrate, a printed circuit board, a package, or the like. Package 100 is thus formed.

FIGS. 23-27, 28A, 28B, 29-32, 33A and 33B illustrate the cross-sectional views and top views of intermediate stages in the formation of a package in accordance with alternative embodiments of the present disclosure. These embodiments are similar to the preceding embodiments, except that optical lenses may be formed in supporting substrates, to which optical fibers may be attached. Unless specified otherwise, the materials, the structures, and the formation processes of the components in these embodiments are essentially the same as the like components denoted by like reference numerals in the preceding embodiments. The details regarding the materials, the structures, and the formation processes of the components shown in these embodiment (and in the embodiments subsequent to FIGS. 33A and 33B) may thus be found in the discussion of the preceding embodiments.

Figures 23, 24:
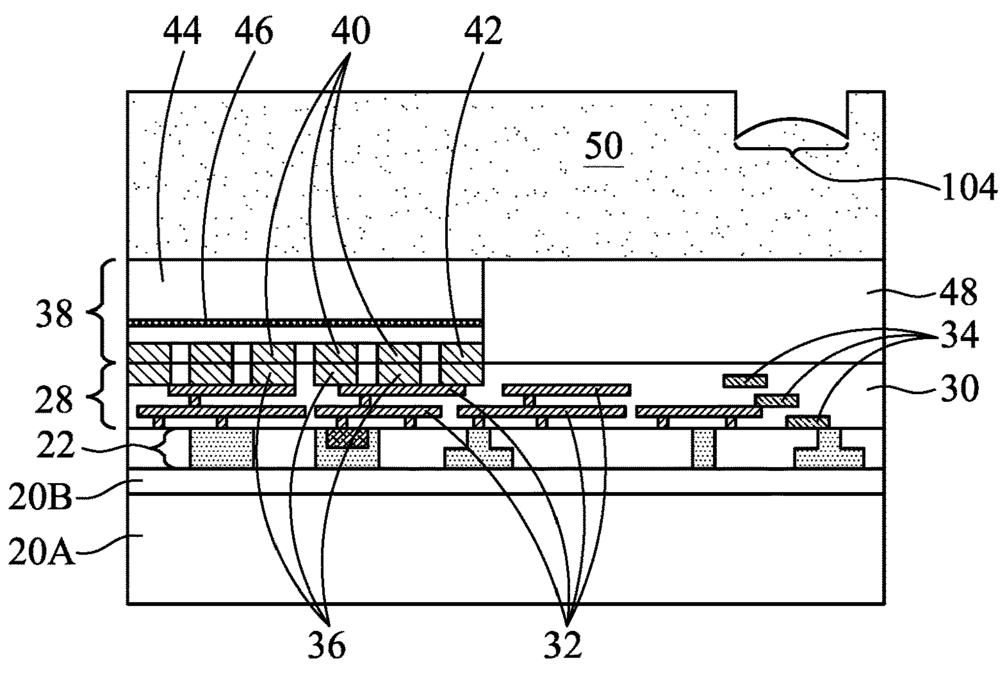
FIGS. 23-27, 28A, 28B, 29-32, 33A, and 33B illustrate the intermediate stages in the formation of a package in accordance with some embodiments.
Figure 25:
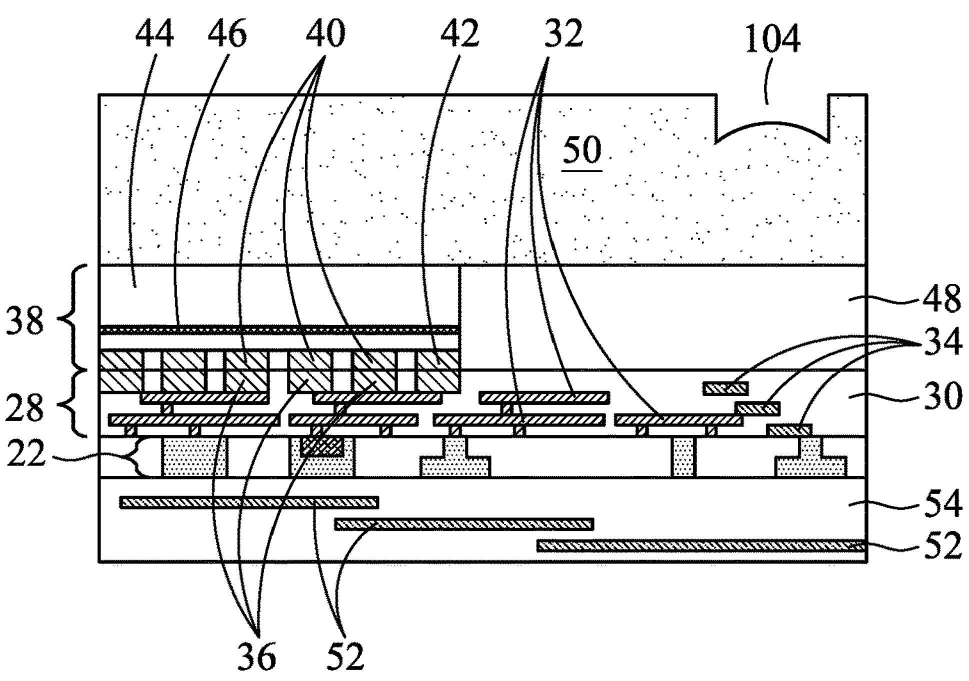
Figure 26:
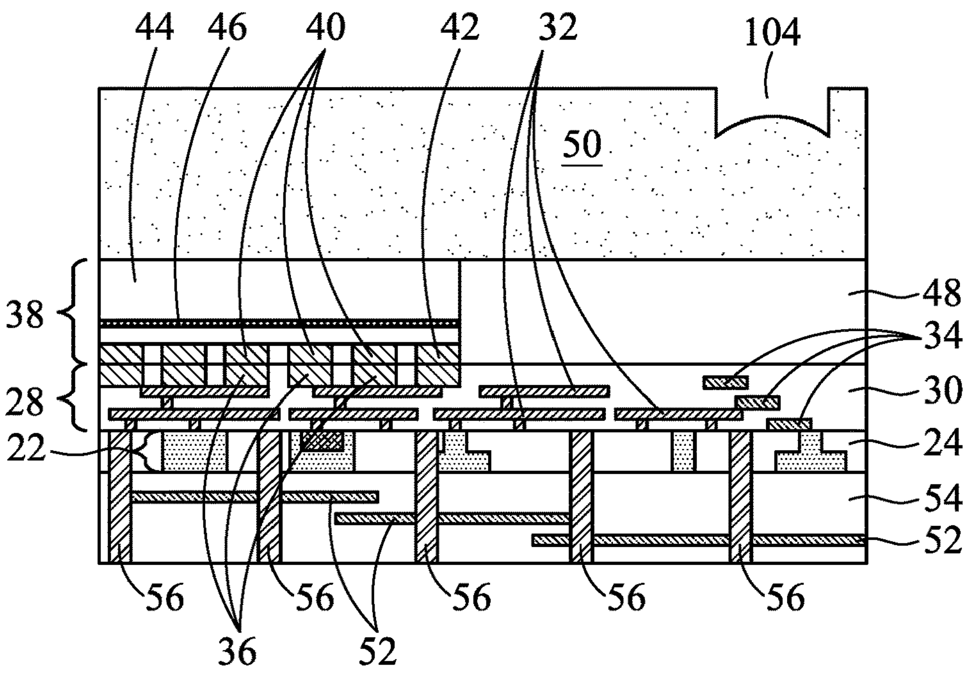
Figure 27:
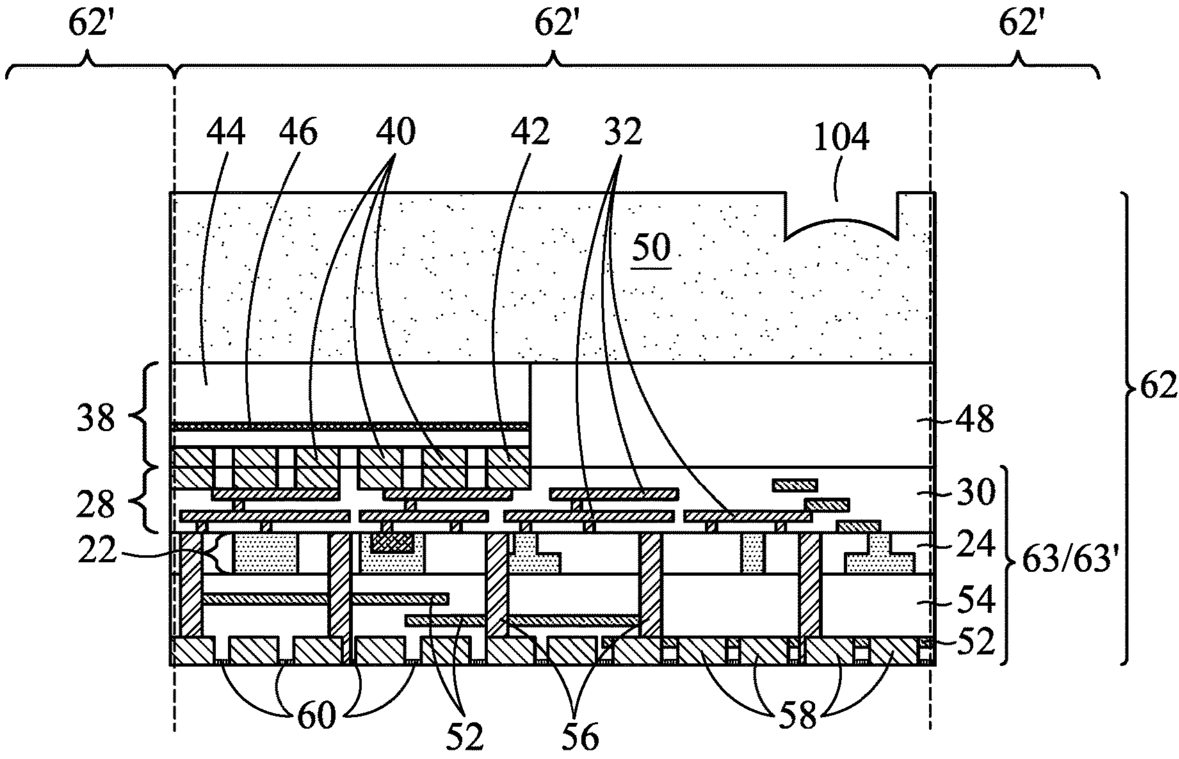

The initial steps of these embodiments are essentially the same as shown in FIGS. 1-8. The resulting structure is shown in FIG. 23. Supporting substrate 50 in accordance with these embodiments includes optical lens 104, which may be formed by etching or grinding supporting substrate 50. The subsequent processes as shown in FIGS. 23-27 are essentially the same as shown in FIGS. 9-12, and are discussed briefly herein. The details are not recited in detail, and may be found in the discussion of FIGS. 9-12. FIG. 24 illustrates a structure after the removal of semiconductor layer 20A and dielectric layer 20B. In FIG. 25, dielectric layers 54 are formed. Nitride waveguides 52 are formed in dielectric layers 54. Through-vias 56 are then formed, as shown in FIG. 26. FIG. 27 illustrates the formation of bond pads 58 and dielectric layer 60, so that reconstructed wafer 62 is formed. A singulation process is then performed to saw reconstructed wafer 62 into optical-engine based interconnect components 62'.

Figure 28A:
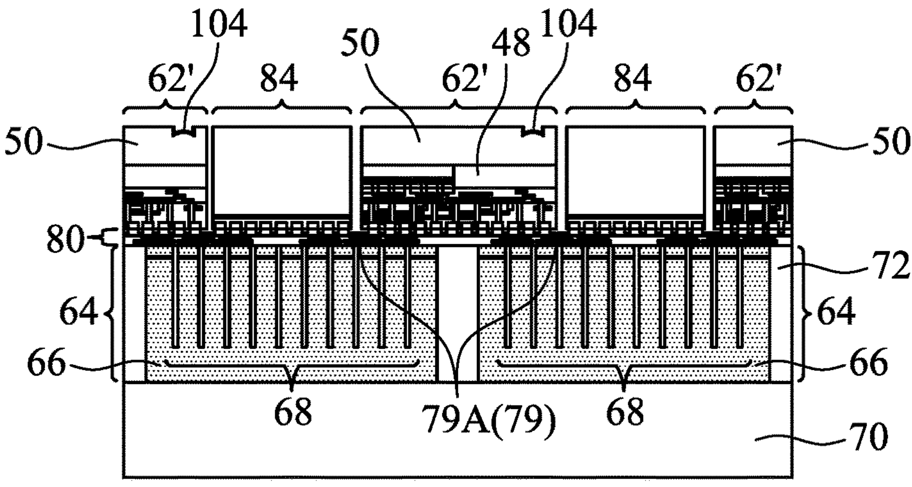
Figure 28B:
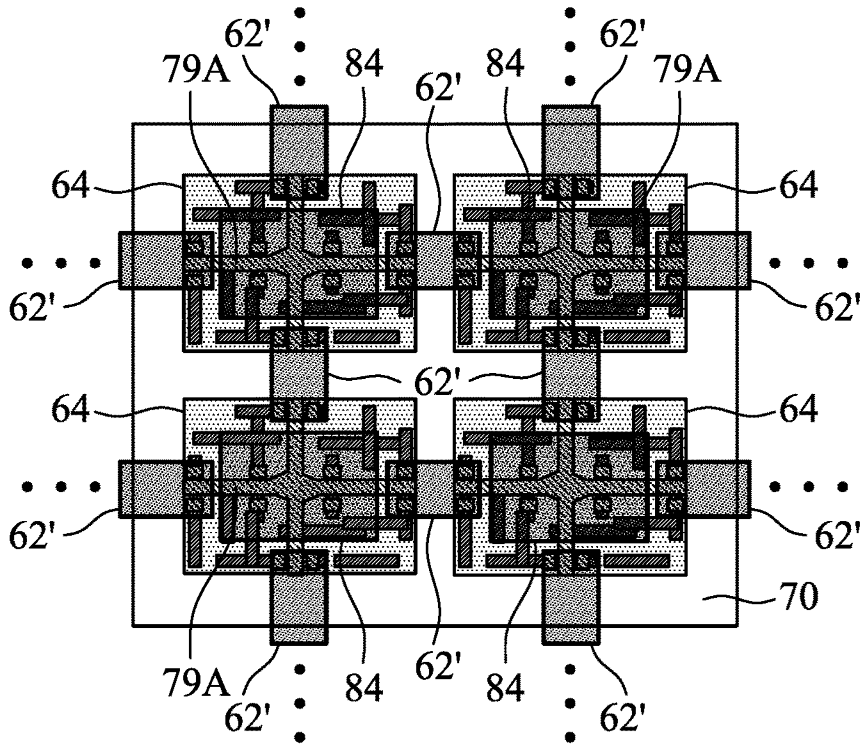
Figure 29:
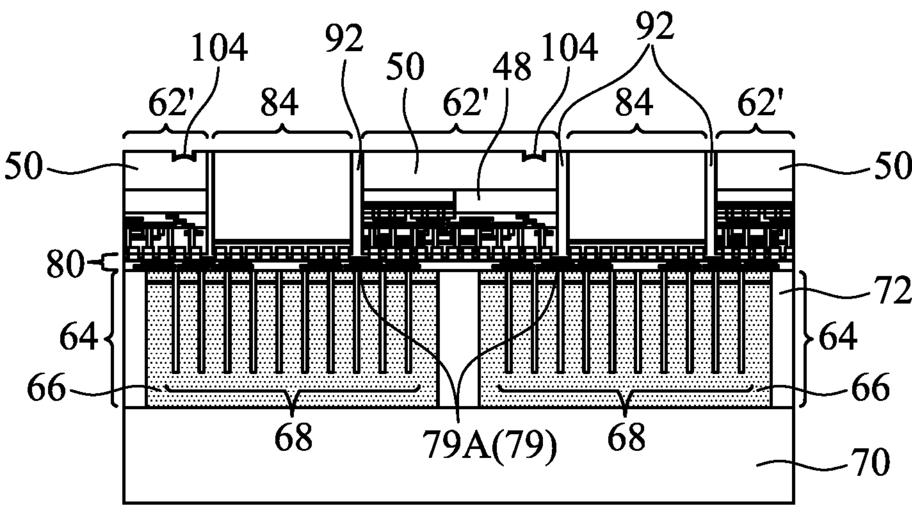

FIGS. 28A, 28B, 29-32, 33A, and 33B illustrate the formation of package 100 incorporating optical-engine based interconnect components 62'. Unless specified otherwise, the processes are essentially the same as in preceding embodiments. The details are not repeated, and may be found in the discussion of FIGS. 14, 15A, 15B, 16A, 16B, 17A, 17B, and 18-22. In accordance with these embodiments, the processes as shown in FIGS. 13A, 13B, 14, 15A, 15B, 16A, and 16B are first performed. Next, as shown in FIGS. 28A and 28B, which illustrate a cross-sectional view and a top view, respectively, device dies 84 and optical-engine based interconnect components 62' are bonded. Optical lenses 104 may be filled with a protecting material, which may include, for example, silicon oxide, polyimide, PBO, or the like. FIG. 29 illustrates the formation of gap-filling regions 92.

Figure 30:
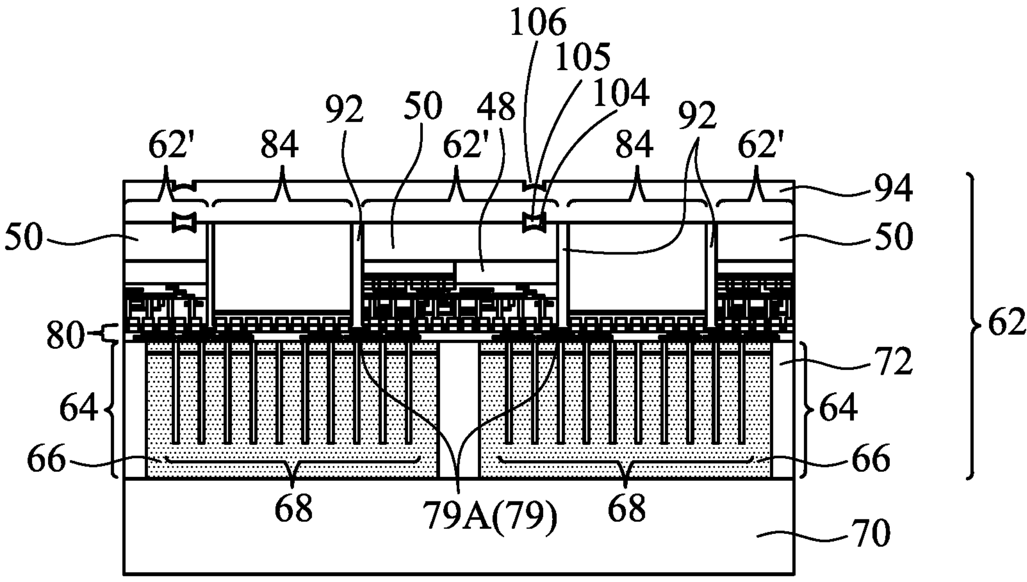
Figure 31:
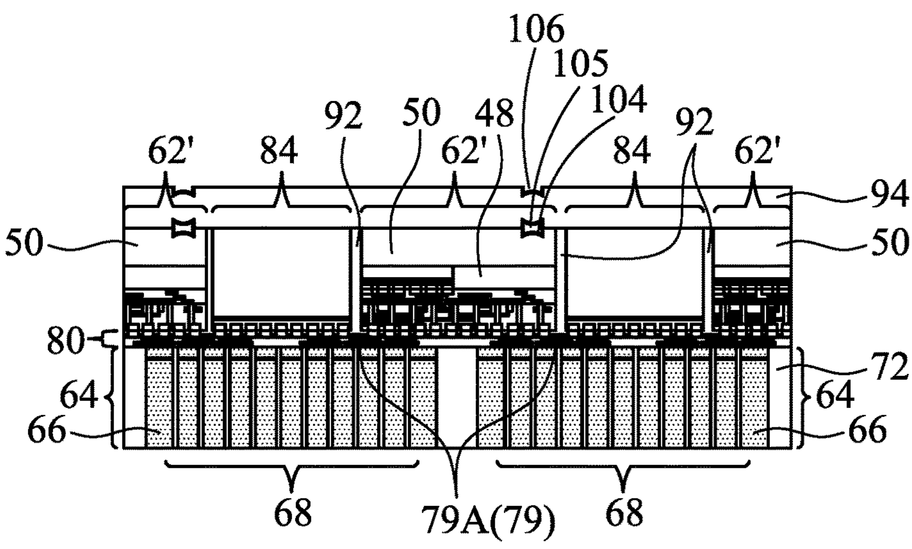
Figure 32:
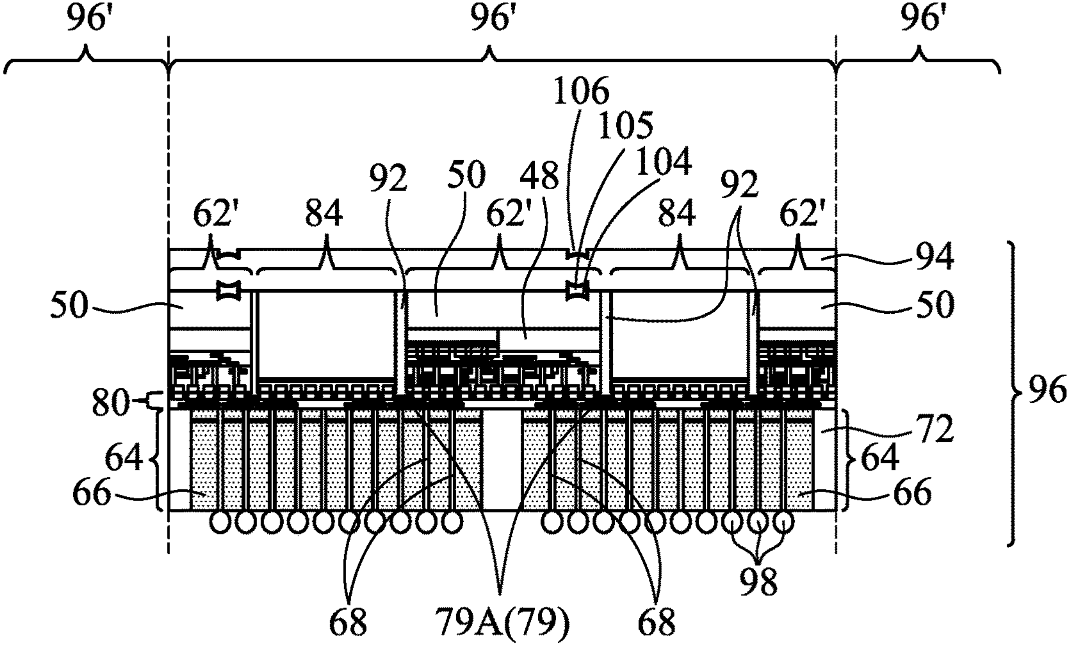

FIG. 30 illustrates the bonding of supporting substrate 94, which includes optical lenses 105 and 106 aligned to optical lenses 104. Optical lenses 105 are at the bottom of supporting substrate 94, while optical lenses 106 are at the top of supporting substrate 94. Next, carrier 70 is removed, followed by the backside grinding of semiconductor substrates 66 in device dies 64, and the resulting structure is shown in FIG. 31. FIG. 32 illustrates the formation of electrical connectors 98. Reconstructed wafer 96 is thus formed, and may be (or may not be) sawed as discrete packages 96'.

Figure 33A:
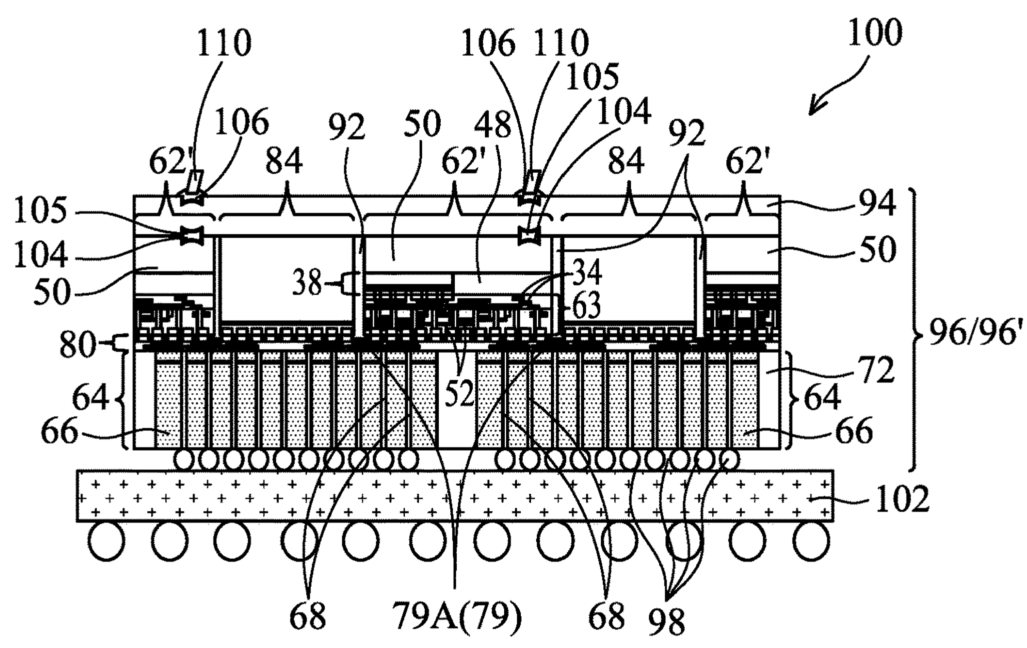
Figure 33B:
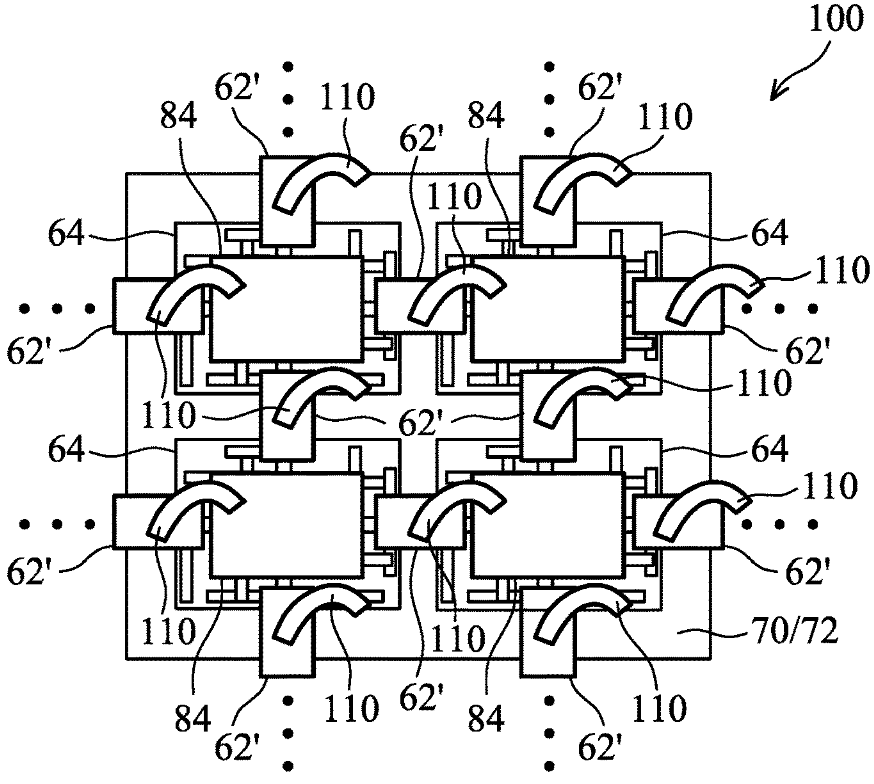

FIGS. 33A and 33B illustrate a top view and a cross-sectional view, respectively, of package 100. Optical fibers 110 are attached to optical lenses 106, so that optical signals may pass through optical lenses 106, 105, and 104, and are received by optical-engine based interconnect components 62'.

Figure 34A:
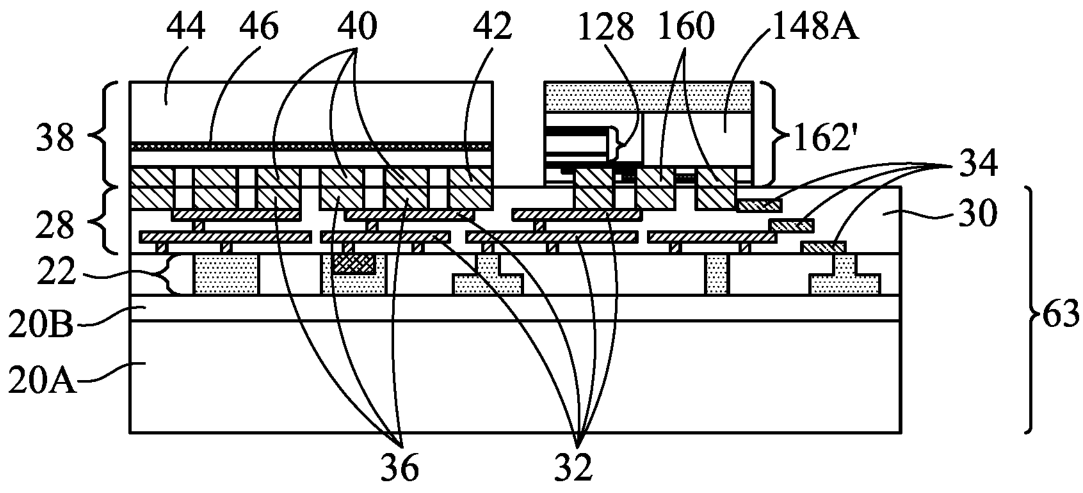
FIGS. 34A, 34B, 35-40, 41A, 41B, and 42-46 illustrate the intermediate stages in the formation of a package in accordance with some embodiments.
Figure 34B:
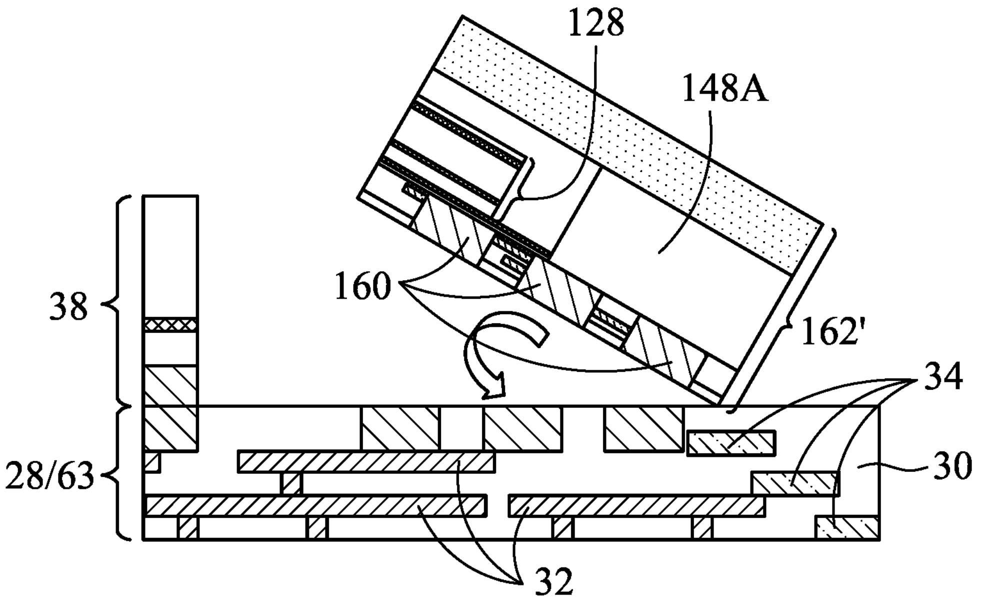

FIGS. 34A, 34B, 35-40, 41A, 41B, and 42-46 illustrate the cross-sectional views of intermediate stages in the formation of a package in accordance with yet alternative embodiments of the present disclosure. These embodiments are similar to the embodiments shown in preceding figures, except that laser dies may be built inside optical-engine based interconnect components 62'. The initial steps of these embodiments are essentially the same as shown in FIGS. 1-6. Next, as shown in FIG. 34A, laser die 162' is bonded to photonic wafer 63, for example, through hybrid bonding. The formation of laser die 162' may be found in FIGS. 47-61 in accordance with some embodiments. Laser die 62' may include laser device 128, oxide region 148A, and bond pads 160. FIG. 34B schematically illustrates a magnified view of laser die 162', and how it is placed on interconnect structure 28.

Figures 35, 36:
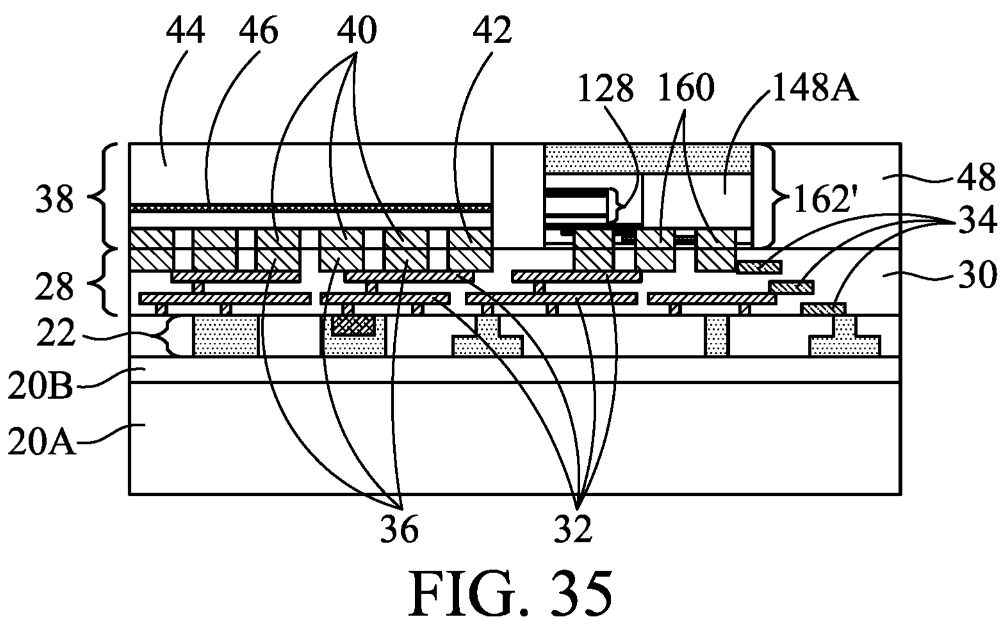
Figure 37:
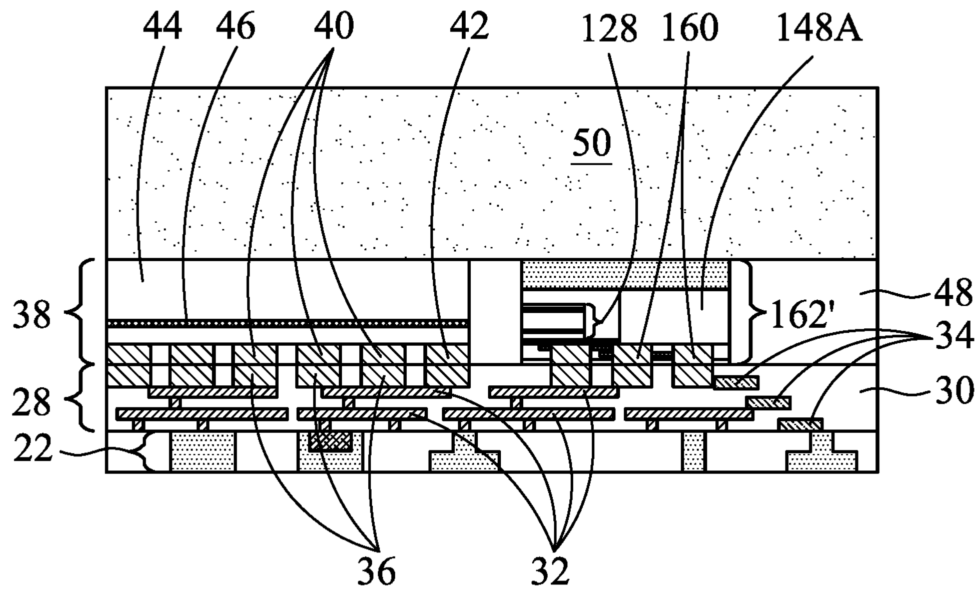

Next, as shown in FIG. 35, gap-filling region 48 (also referred to as gap-filling material 48) is formed. Laser die 162' may generate optical signals, which signals are controlled by the electrical signals received through bond pads 160 (FIG. 34B). The optical signals are projected onto the photonic devices 22 such as grating couplers. The subsequent processes as shown in FIGS. 23-27 are essentially the same as in preceding embodiments, and are discussed briefly herein. The details are not repeated, and may be found in the preceding embodiments. As shown in FIG. 36, supporting substrate 50 is bonded. FIG. 37 illustrates a structure after the removal of semiconductor layer 20A and dielectric layer 20B.

Figure 38:
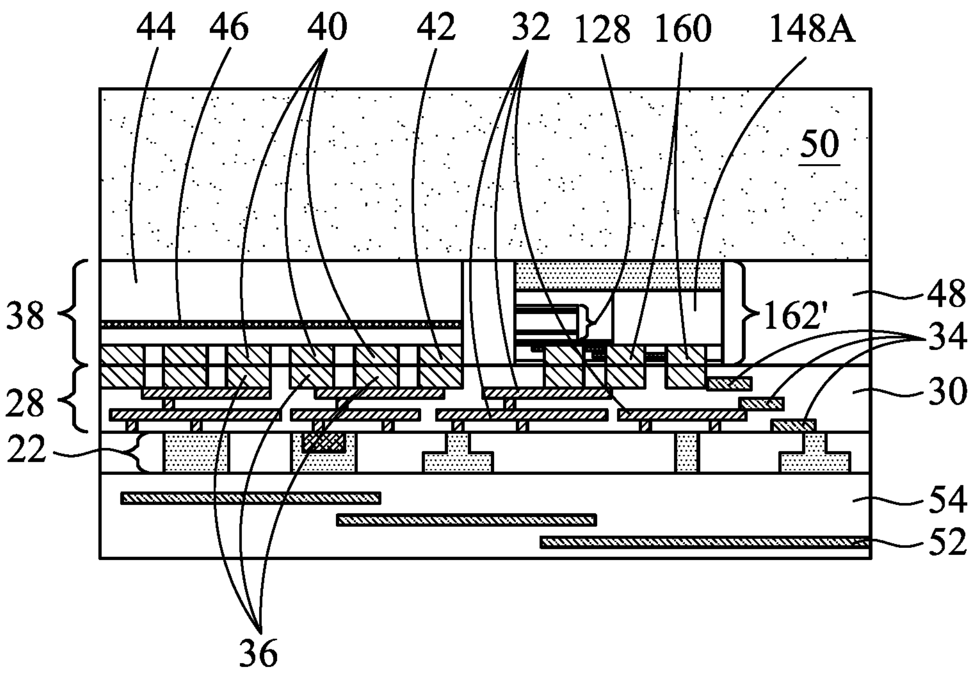
Figure 39:
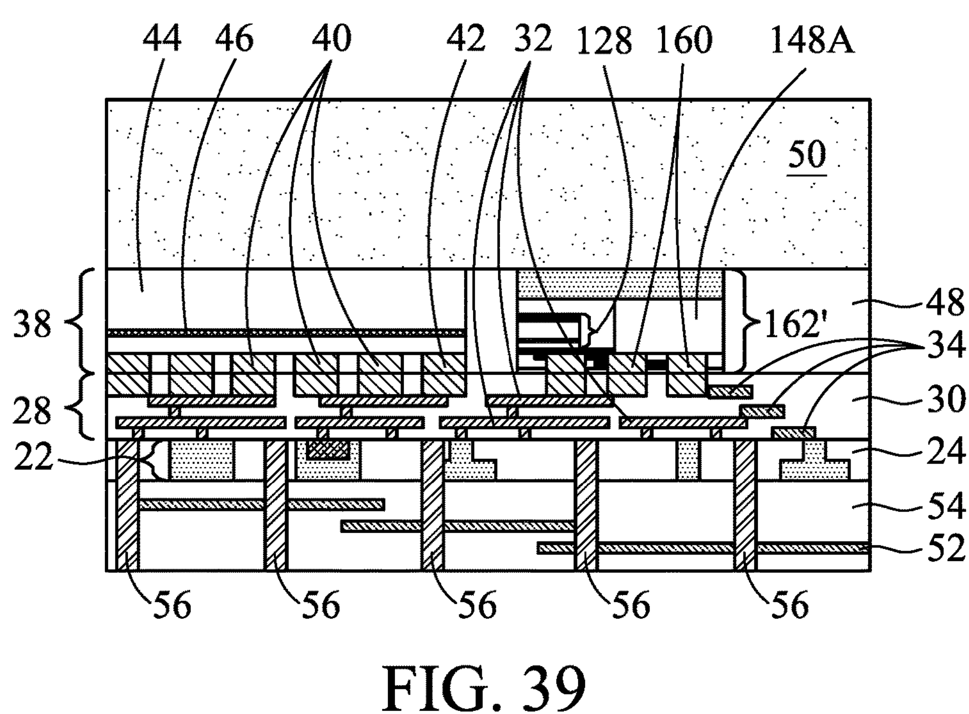
Figure 40:
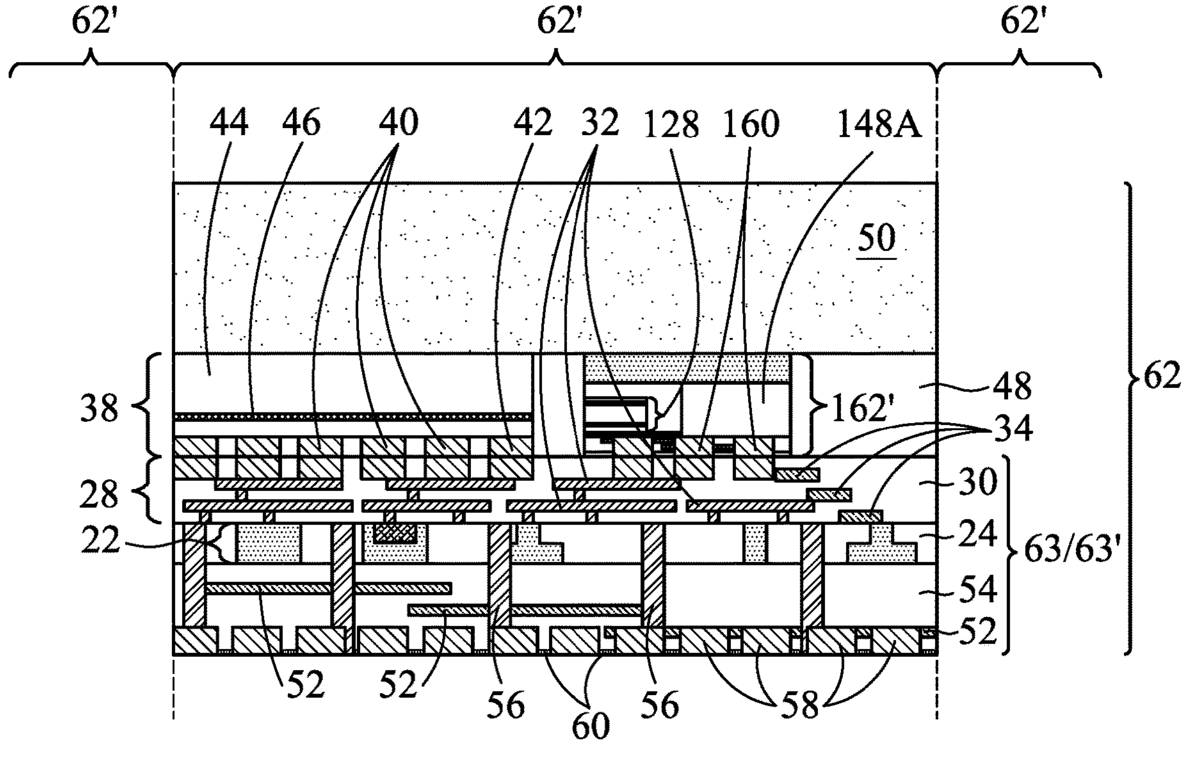

In FIG. 38, dielectric layers 54 are formed, and nitride waveguides 52 are formed in dielectric layers 54. Through-vias 56 are then formed, as shown in FIG. 39. FIG. 40 illustrates the formation of bond pads 58 and dielectric layer 60, so that reconstructed wafer 62 is formed. A singulation process is then performed to saw reconstructed wafer 62 into optical-engine based interconnect components 62'.

Figure 41A:
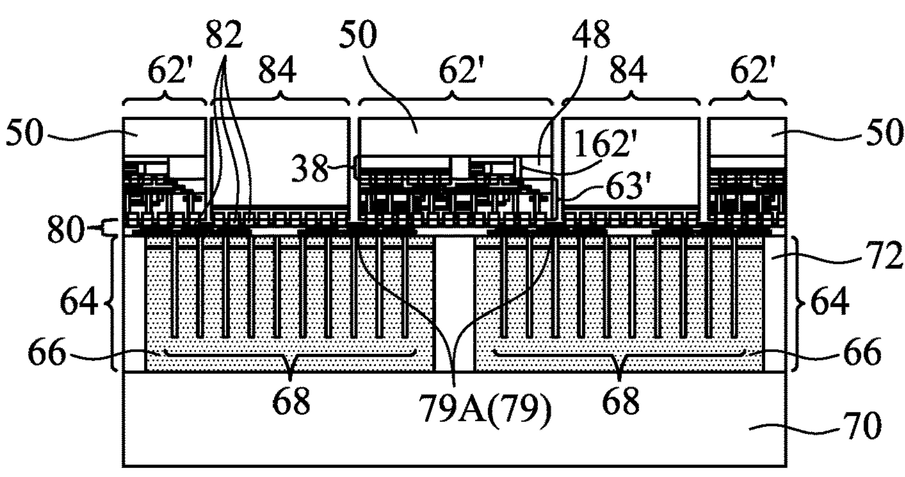
Figure 41B:
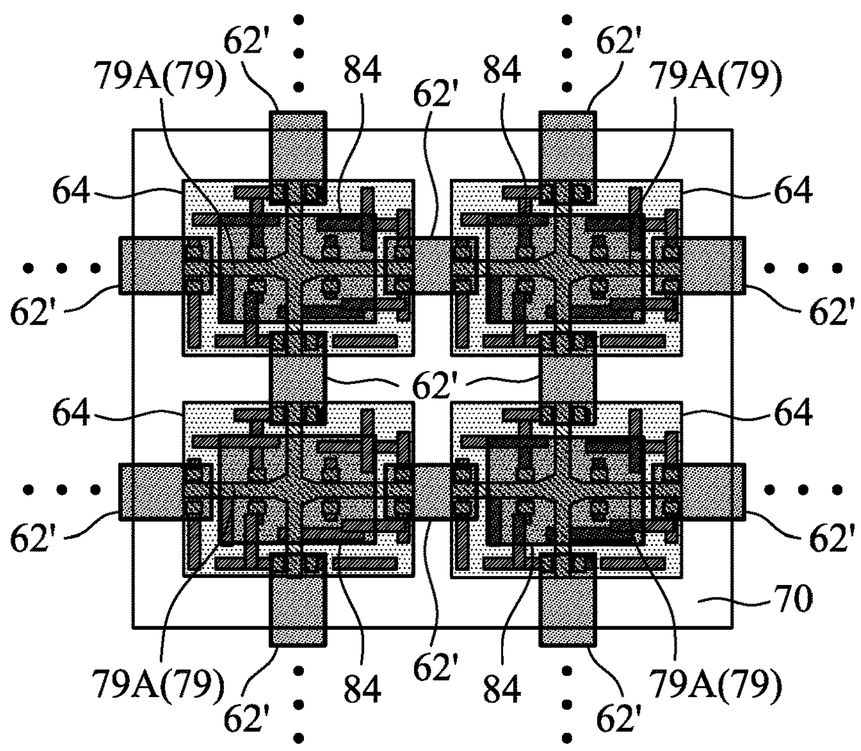
Figure 42:
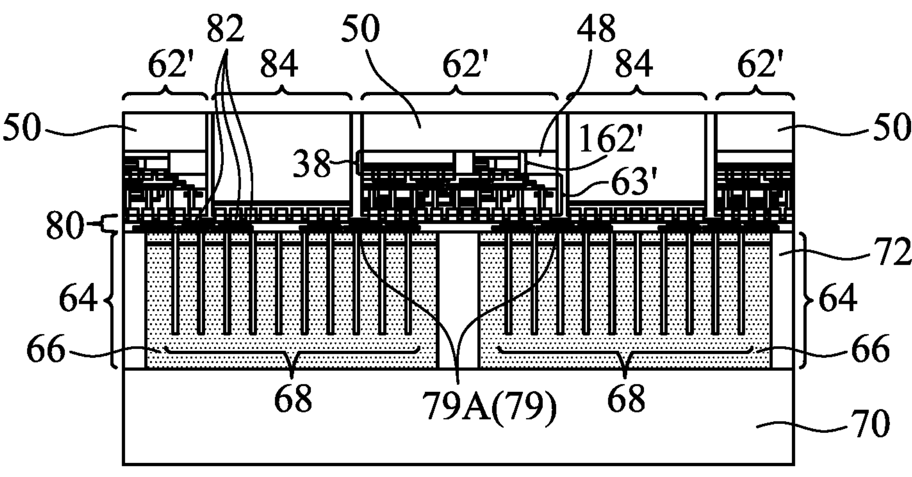

FIGS. 41A, 41B, and 42-46 illustrate the formation of package 100 adopting optical-engine based interconnect components 62' as formed in preceding processes. The processes are essentially the same as in preceding embodiments. The details are not repeated herein, and may be found in the discussion of preceding embodiments. In according to these embodiments, the processes as shown in FIGS. 13A, 13B, 14, 15A, 15B, 16A, and 16B are first performed. Next, as shown in FIGS. 41A and 41B, which illustrate a cross-sectional view and a top view, respectively, device dies 84 and optical-engine based interconnect components 62' are bonded, followed by the formation of gap-filling regions 92, as shown in FIG. 42.

Figure 43:
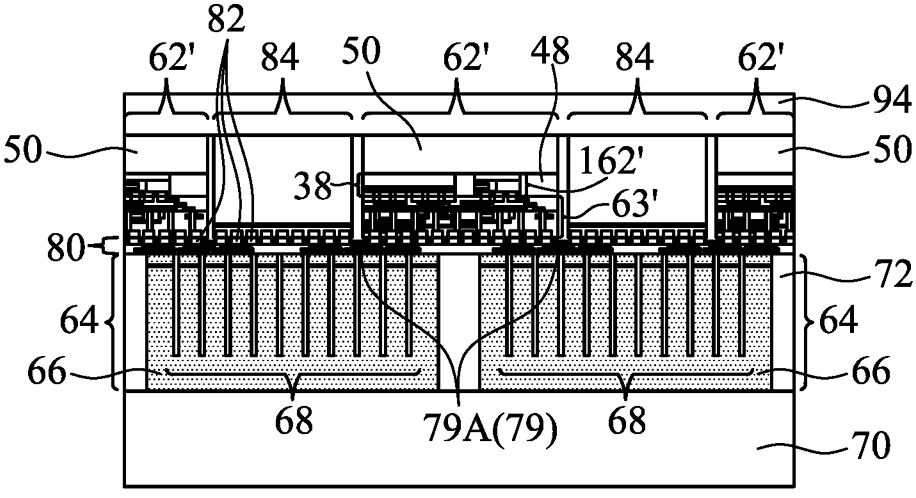
Figure 44:
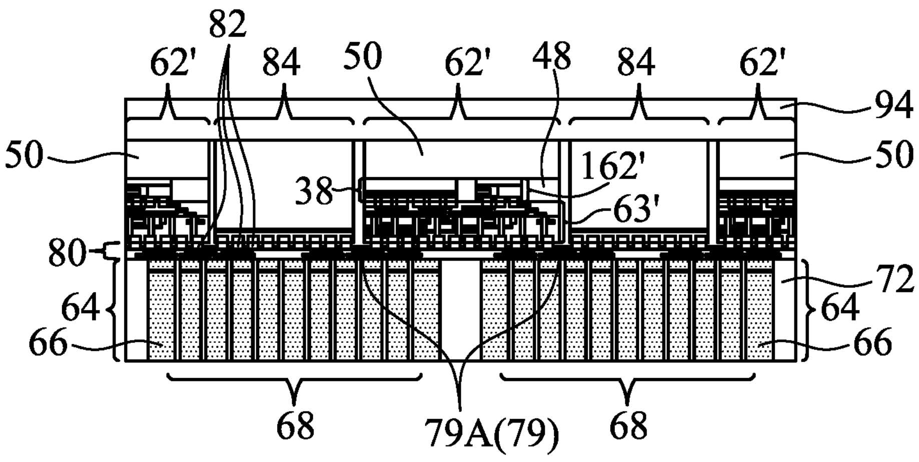
Figure 45:
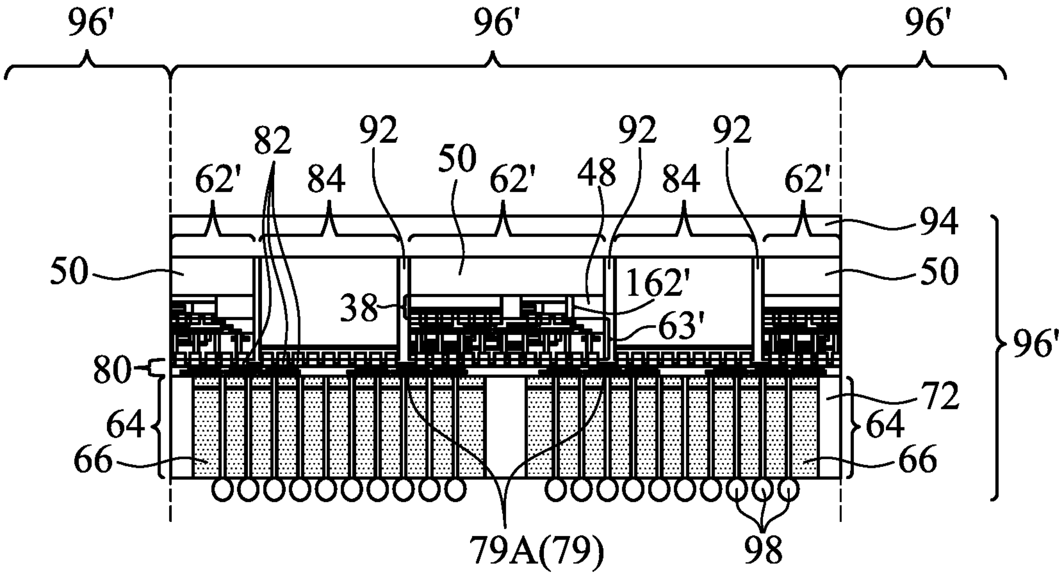
Figure 46:
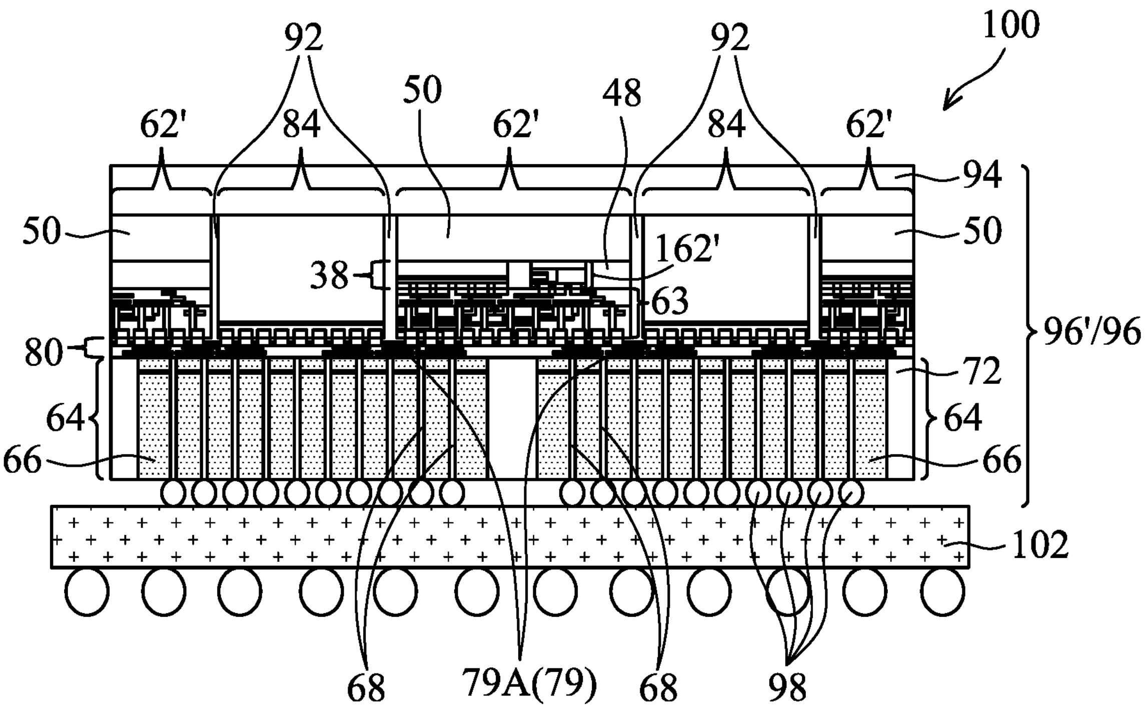

FIG. 43 illustrates the bonding of supporting substrate 94. Next, carrier 70 is removed, followed by the backside grinding of semiconductor substrates 66 in device dies 64, and the resulting structure is shown in FIG. 44. FIG. 45 illustrates the formation of electrical connectors 98. Reconstructed wafer 96 is thus formed, and may be (or may not be) sawed into packages 96'. FIG. 46 illustrates a cross-sectional view of package 100, which includes package 96' (or unsawed reconstructed wafer 96) bonded to package component 102. In accordance with these embodiments, laser die 162' is built inside optical-engine based interconnect component 62'.

FIGS. 47-56, 57A, 57B, and 58-61 illustrate the intermediate stages in the formation of a laser die in accordance with some embodiments. The laser die is used in the formation of a package, which may be located either inside or outside of optical-engine based interconnect components 62'.

Figure 47:
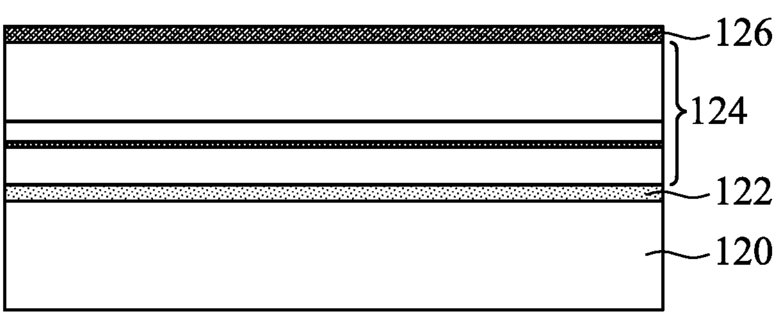
FIGS. 47-56, 57A, 57B, and 58-61 illustrate the intermediate stages in the formation of a laser die in accordance with some embodiments.

Referring to FIG. 47, an initial structure for forming a laser die is formed. In accordance with some embodiments, the initial structure includes (sacrificial) substrate 120. N-type contact layer 122, quantum well layers 124, and p-type contact layer 126 may be epitaxially grown on substrate 120. Substrate 120, n-type contact layer 122, quantum well layers 124, and p-type contact layer 126 may be formed of or comprise III-V semiconductor materials. For example, substrate 120 may be formed of or comprise InP, while quantum well layers 124 may comprise GaAs, AlGaAs, or the like. N-type contact layer 122 and p-type contact layer 126 are doped as n-type and p-type, respectively.

Figure 48:
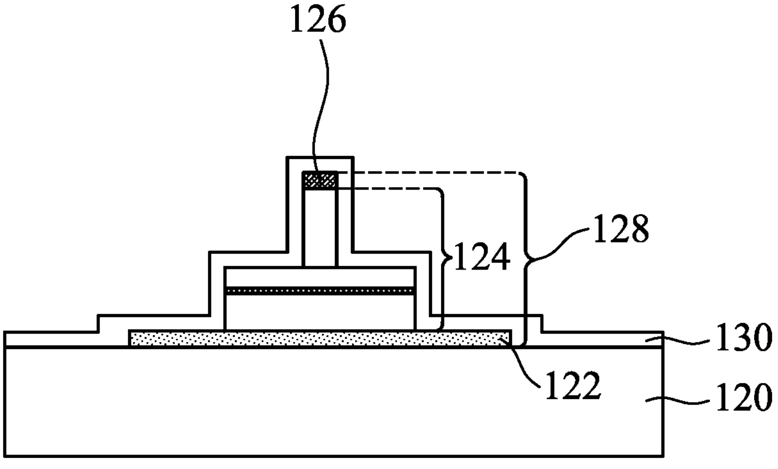

Referring to FIG. 48, n-type contact layer 122, quantum well layers 124, and p-type contact layer 126 are patterned to form (quantum well) laser device 128. A passivation layer 130, which is also a dielectric layer, is deposited to electrically isolate laser device 128. Passivation layer 130 may be formed of or comprise silicon oxide, silicon nitride, or the like.

Figure 49:
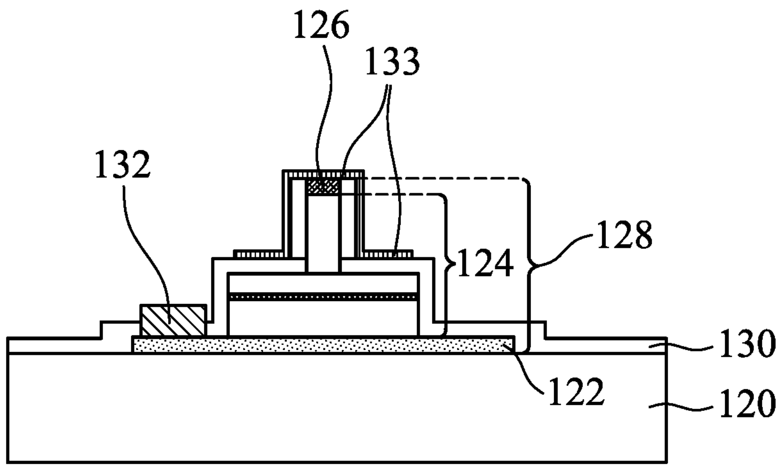

Next, as shown in FIG. 49, a contact hole is formed in passivation layer 130 through etching, followed by forming contact plug 132 in the contact hole and on n-type contact layer 122. Contact plug 132 may be formed of or comprise tungsten, cobalt, nickel, copper, or the like. Also, the top portions of passivation layer 130 directly over p-type contact layer 126 are removed. Contact metal layer 133 is also formed to contact p-type contact layer 126.

Figure 50:
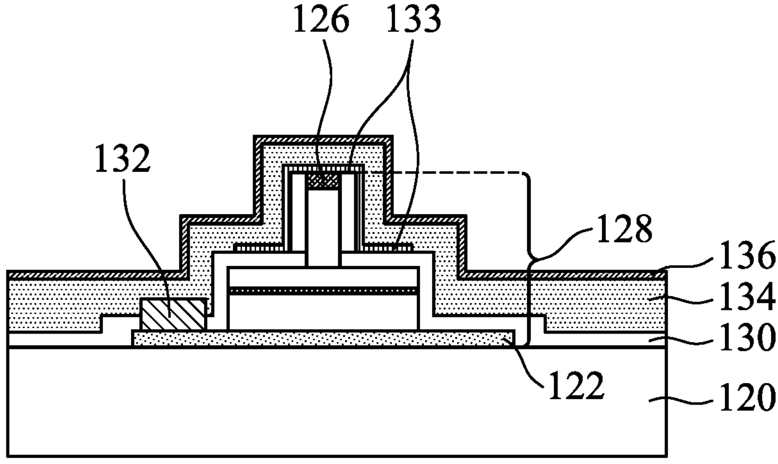

FIG. 50 illustrates the formation of passivation layers 134 and 136, which may be formed through conformal deposition processes. In accordance with some embodiments, passivation layers 134 and 136 are formed of silicon oxide and silicon nitride, respectively, while other materials may be used.

Figure 51:
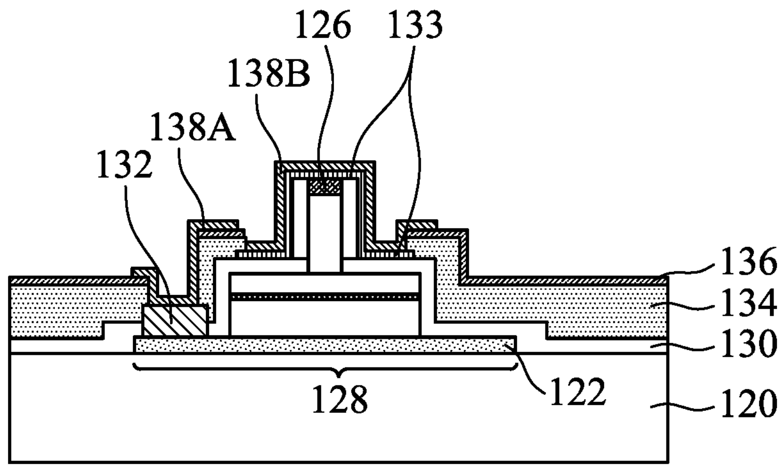

FIG. 51 illustrates the formation of conductive protection layers 138A and 138B. Conductive protection layer 138A contacts contact plug 132. Conductive protection layer 138B is formed on contact metal layer 133. The formation process may include depositing a conductive layer such as a Ti layer, a Ta layer, a TiN layer, a TaN layer, or the like, and then patterning the metal layer.

Figure 52:
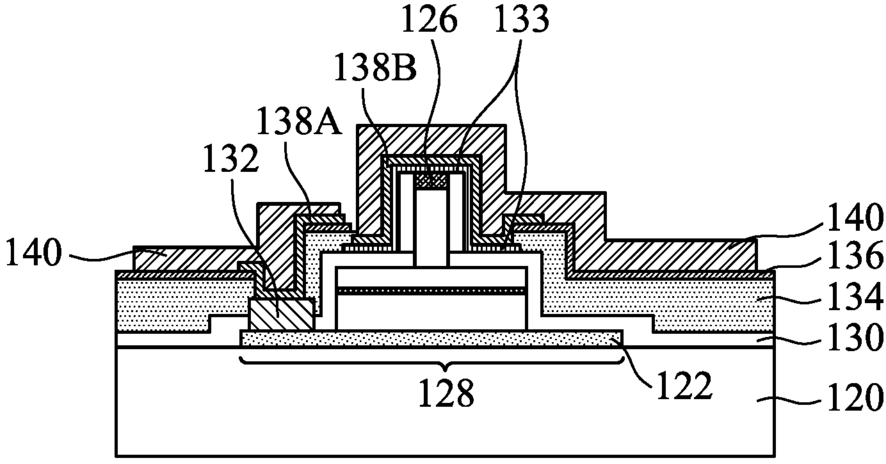

FIG. 52 illustrates the formation of passivation layer 140, which may be formed through a conformal deposition process. Passivation layer 140 is formed of silicon oxide, silicon nitride, or the like. Next, as shown in FIG. 53, a dielectric layer 142 is deposited and is planarized.

Figure 53:
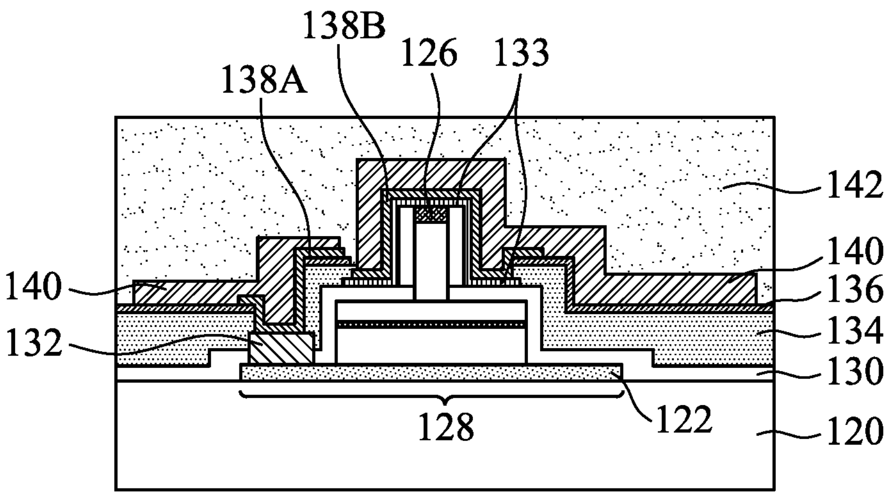
Figure 54:
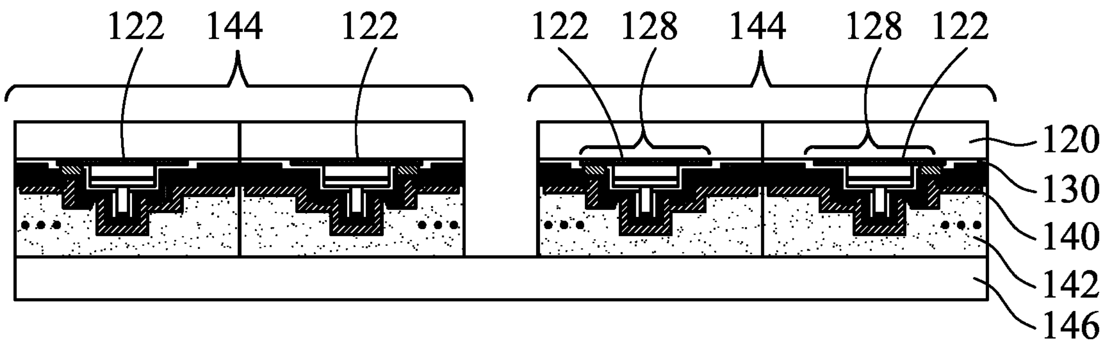

Referring to FIG. 54, the structure as shown in FIG. 53 are sawed into a plurality of discrete structures 144, which are then placed on substrate 146, with substrates 120 facing up. In accordance with some embodiments, substrate 146 is a silicon substrate, while other materials such as III-V semiconductors may be used.

Figure 55:
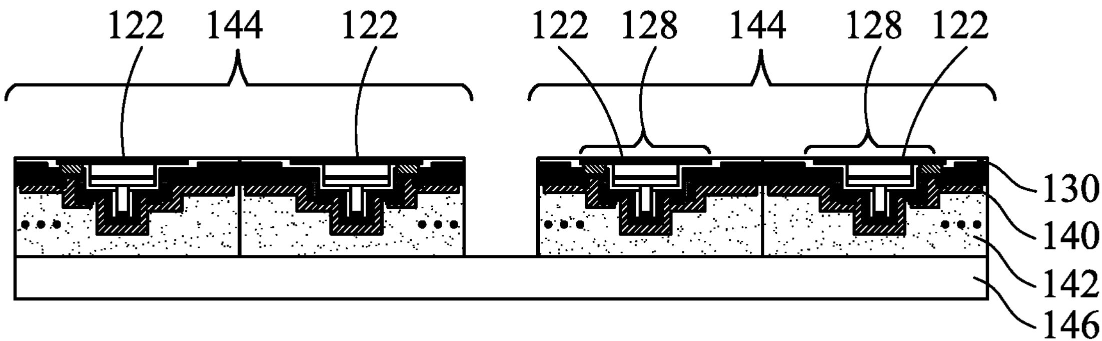
Figure 56:
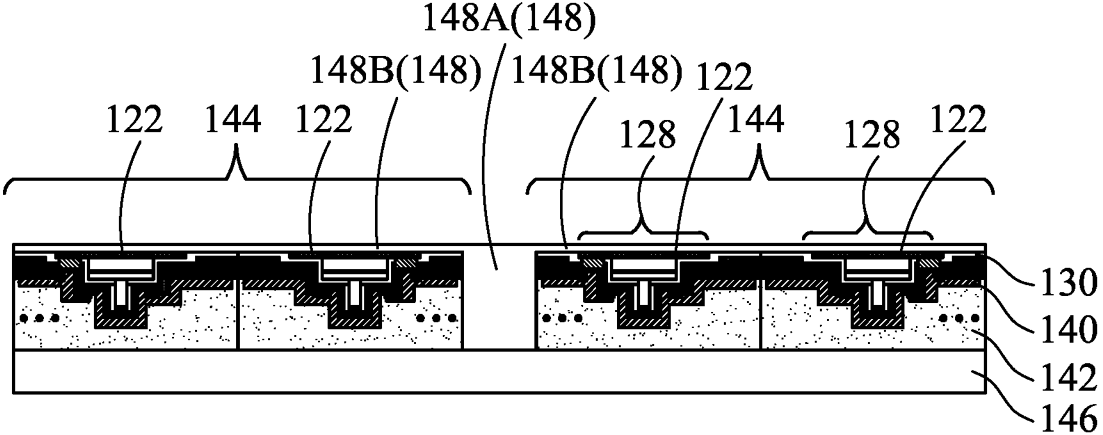

Next, the sacrificial substrates 120 are removed, for example, through a polishing process. The resulting structure is shown in FIG. 55. N-type contact layer 122 are exposed. Next, as shown in FIG. 56, a dielectric material 148 is deposited, and is then planarized, for example, in a mechanical grinding process. The dielectric material 148 may be formed of silicon oxide, silicon oxynitride, or the like. The portions of the dielectric material 148 between neighboring structures 144 are referred to as isolation regions 148A, which are also gap-filling regions. The portions of the dielectric material 148 overlapping structures 144 are referred to as dielectric layer 148B.

Figure 57A:
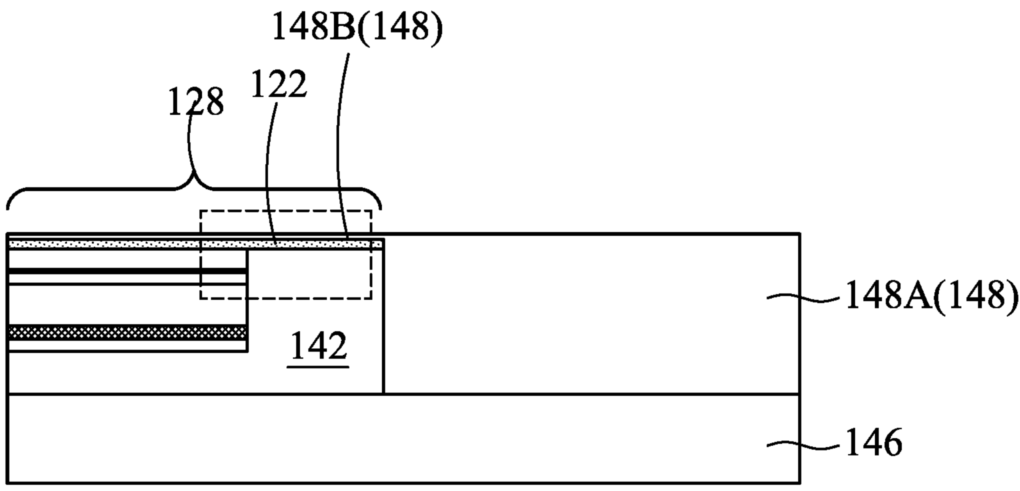
Figure 57B:
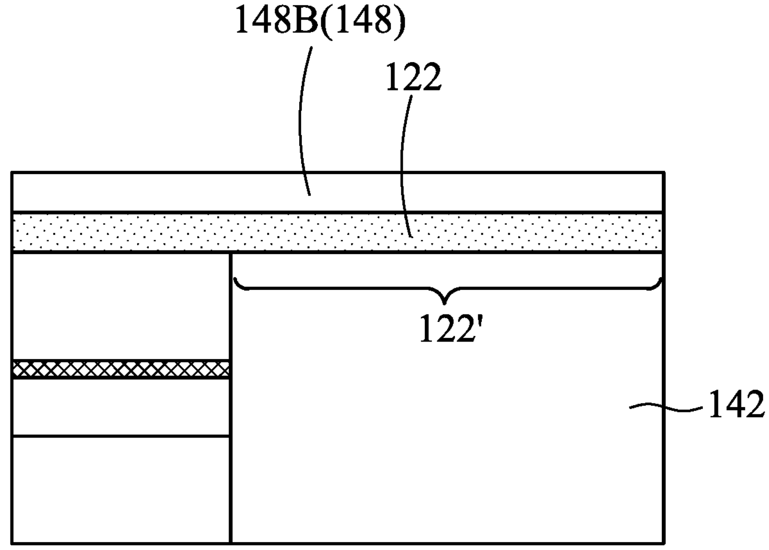

FIG. 57A illustrates a magnified view of a portion 150 of the structure 144 as shown in FIG. 56. FIG. 57B illustrates a magnified view of a portion 152 as shown in FIG. 57A. As shown in FIG. 57B, n-type contact layer 122 may have a portion 122' extending beyond other parts of laser device 128, and directly over dielectric layer 142. Portion 122', besides its function of acting as a part of the n-type contact layer, also has the ability of transporting optical signals (light).

Figure 58:
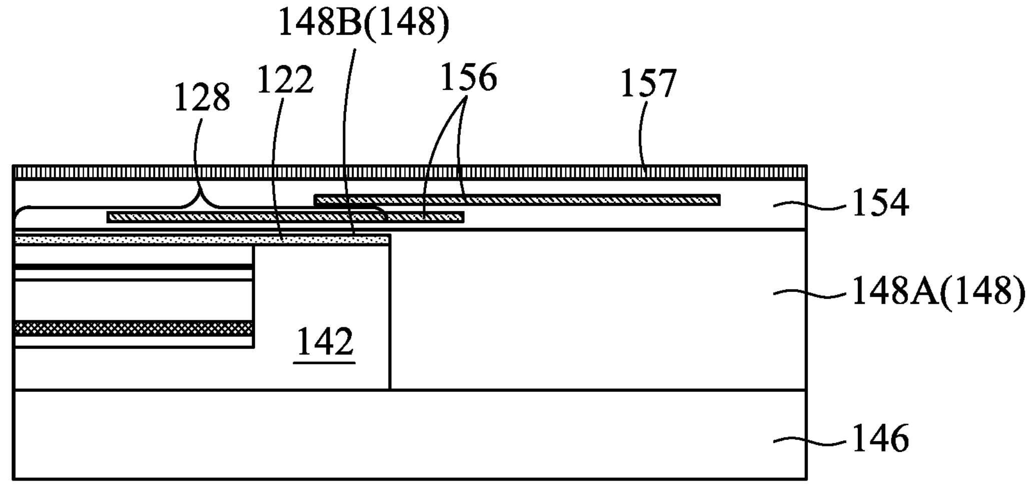
Figure 59:
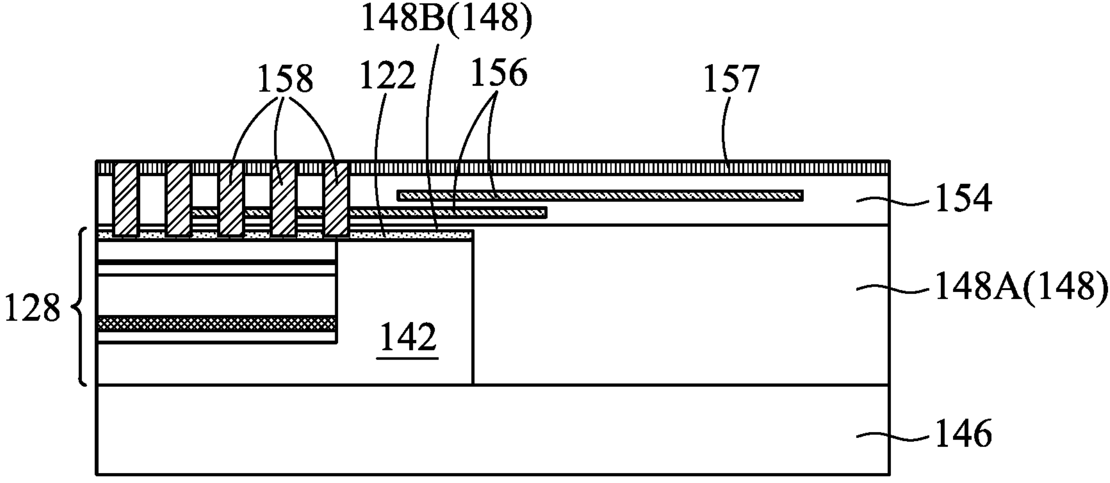

FIG. 58 illustrates the formation of dielectric layers 154 and 157 and waveguides 156 therein. Dielectric layers 154 may be light-transparent. Waveguides 156 may be formed of silicon nitride, silicon oxynitride, a polymer(s), or the like. FIG. 59 illustrates the formation of conductive vias 158, which penetrate through dielectric layers 154 and 157. Some of conductive vias 158 are electrically connected to n-type contact layer 122. Some other conductive vias 158 may also be electrically connected to p-type contact layer 126, while the connection scheme is not in the illustrated plane.

Figure 60:
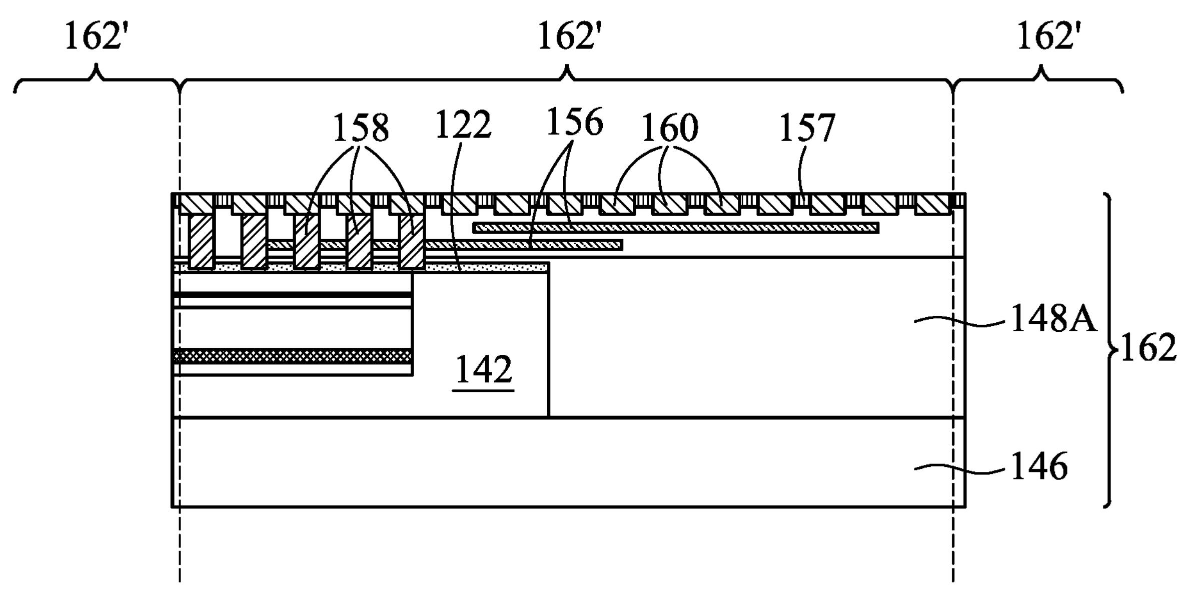
Figure 61:
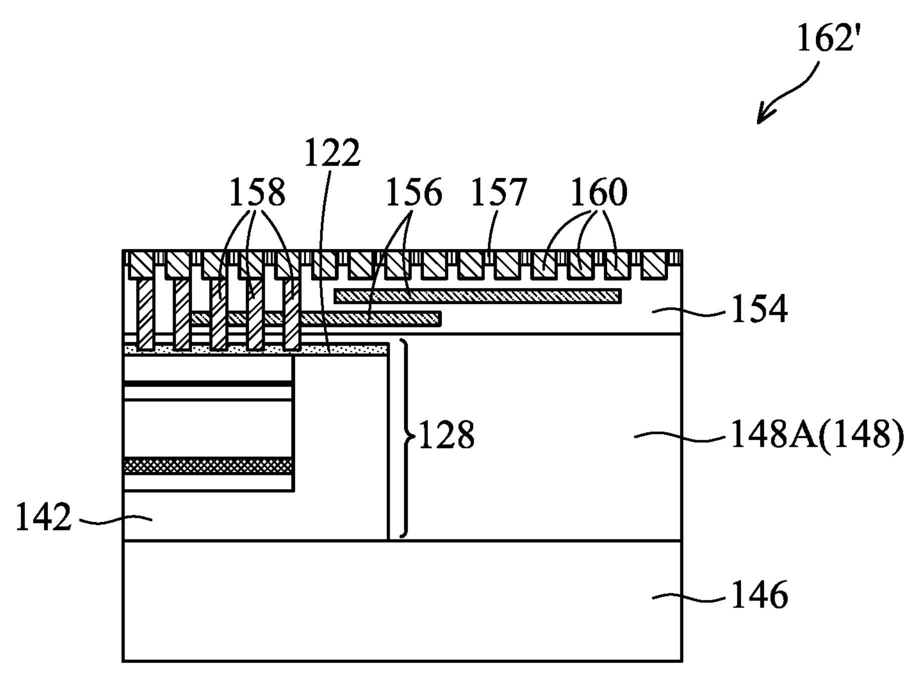

FIG. 60 illustrates the formation of electrical connectors 160. In accordance with some embodiments, electrical connectors 160 are metal pads, which may be formed in dielectric layer 157. Electrical connectors 160 are electrically to the conductive vias 158, n-type contact layer 122, and p-type contact layer 126 (FIG. 53). Laser device wafer 162 is thus formed. A singulation process is then performed to saw device wafer 162 as a plurality of identical laser dies 162'. One of the laser dies 162' is shown in FIG. 61.

FIGS. 62A, 62B, 62C and 63-67 illustrate the cross-sectional views and top views of intermediate stages in the formation of a package 100 in accordance with some embodiments of the present disclosure. These embodiments are similar to the embodiments shown in preceding figures, except that laser dies 162' are built outside of, rather than inside, optical-engine based interconnect components 62'.

Figure 62A:
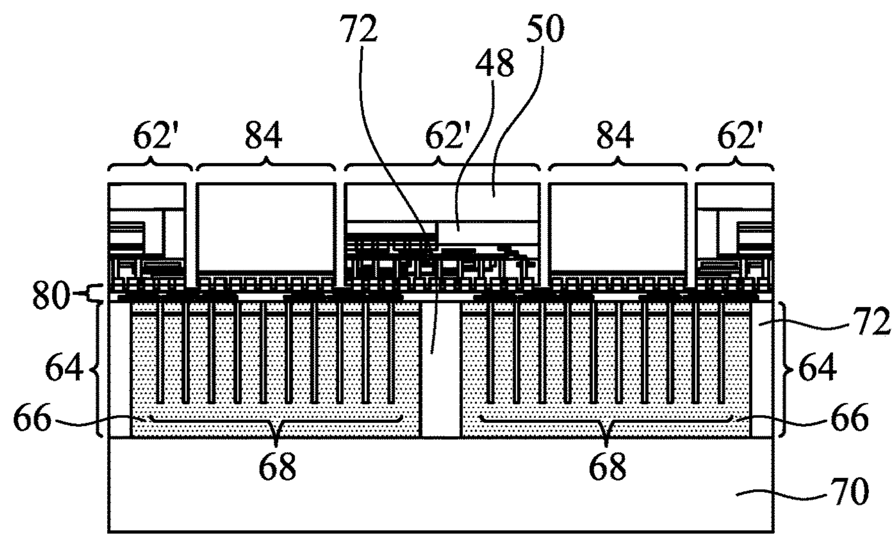
FIGS. 62A, 62B, 62C, and 63-67 illustrate the intermediate stages in the formation of a package incorporating laser dies in accordance with some embodiments.

The initial steps of these embodiments are essentially the same as shown in FIGS. 1-15 and 16A. Next, as shown in FIG. 62A, device dies 84, optical-engine based interconnect components 62', and laser dies 162' are bonded to the underlying interconnect structure 80. Laser dies 162' are electrically coupled to interconnect structure 80. Furthermore, n-type contact layer 122 (which can transfer light) and waveguides 156 in laser dies 162' are optically coupled to waveguides 79B (not marked in FIG. 62A, refer to FIG. 62B), which are inside interconnect structure 80.

Figure 62B:
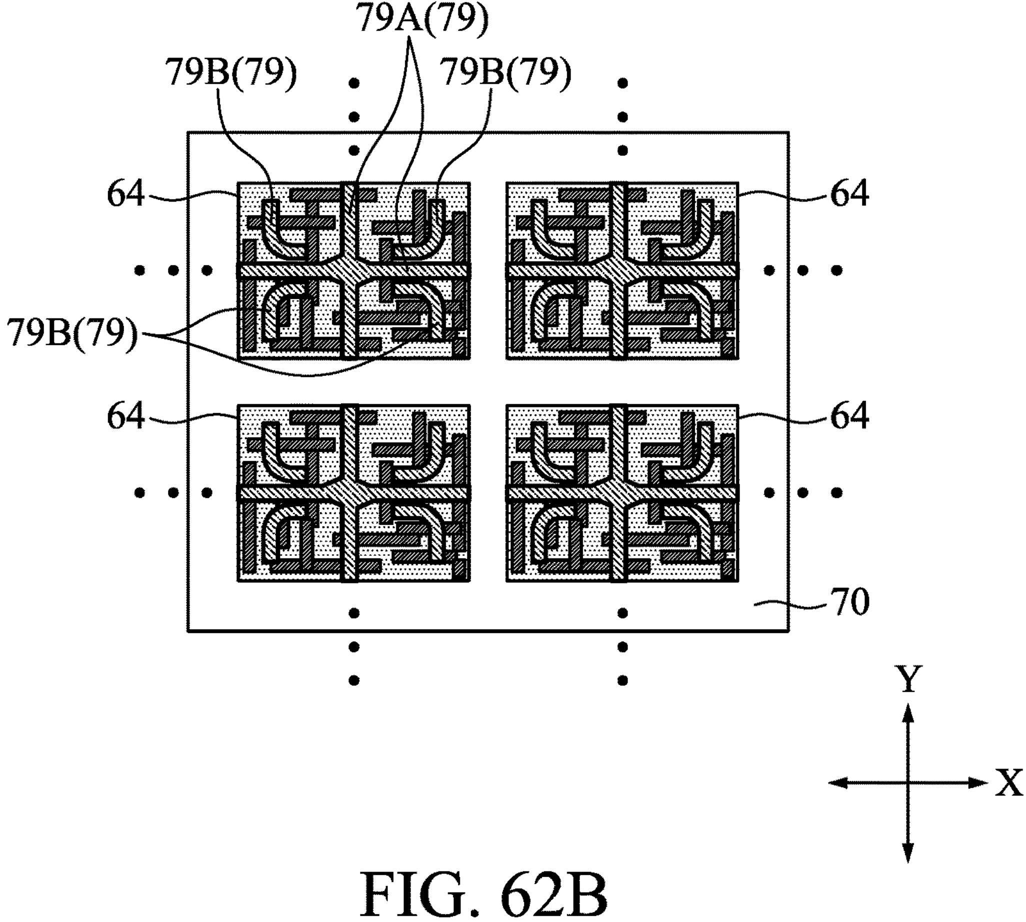
Figure 62C:
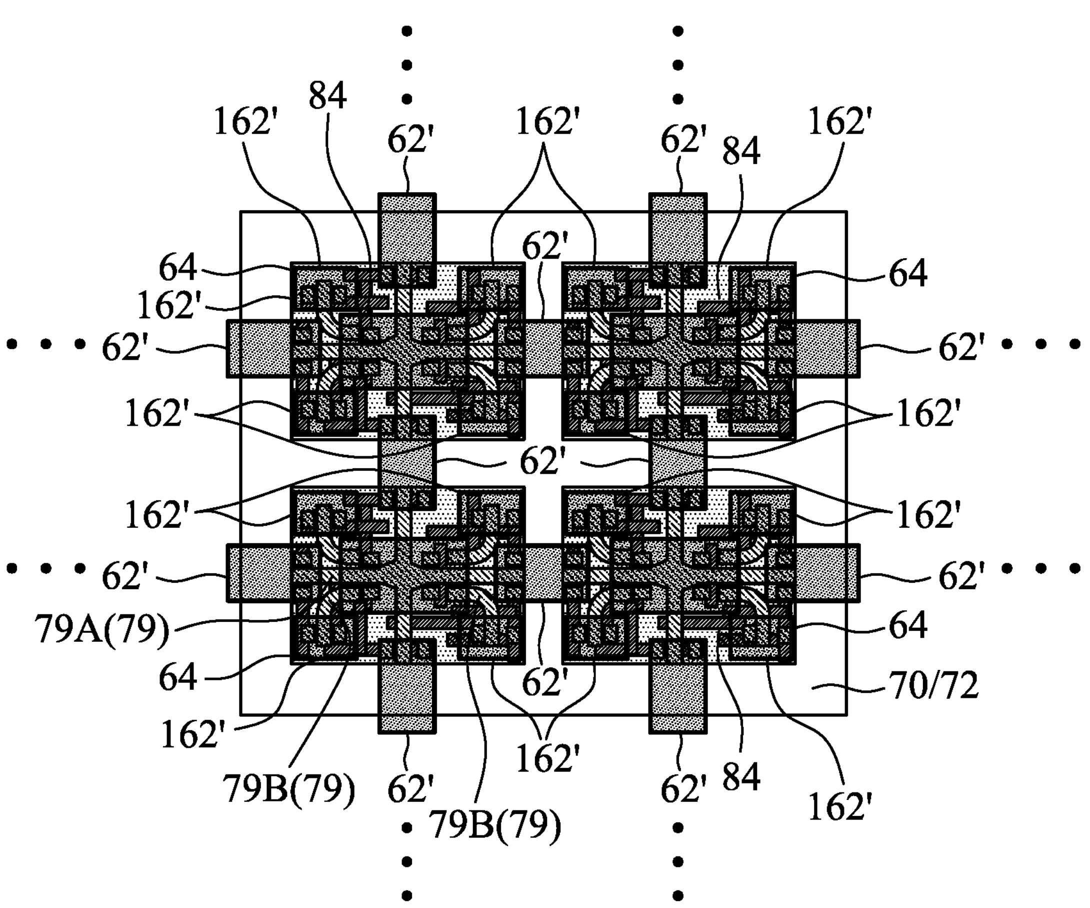

FIG. 62B illustrates a top view of the structure shown in FIG. 62A, and illustrates how waveguides 79 are distributed. Waveguides 79 may include waveguides 79A and 79B, wherein the waveguides 79B transports the optical signals generated in laser dies 162' (FIG. 62C), and optically couple the optical signals into waveguides 79A, which act as the buses of the optical signals. FIG. 62C further illustrates how laser dies 162' and optical-engine based interconnect components 62' are allocated.

Figure 63:
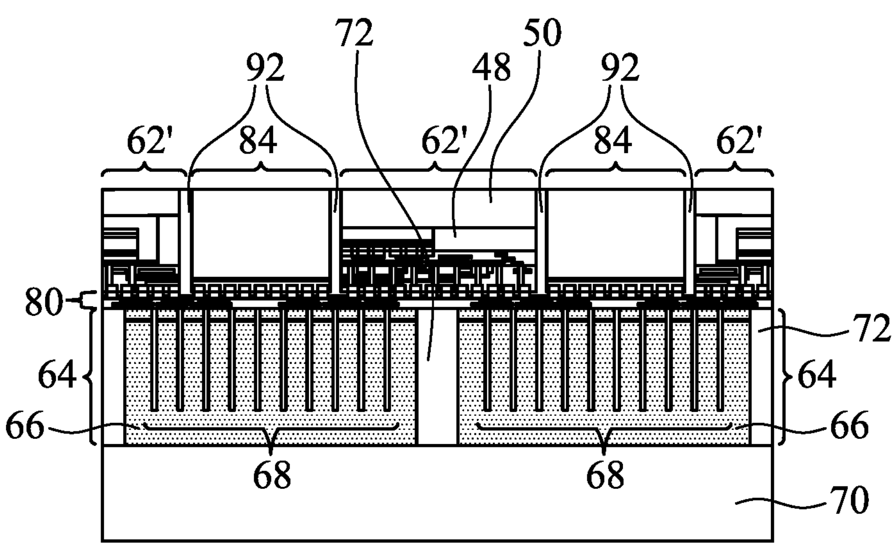
Figure 64:
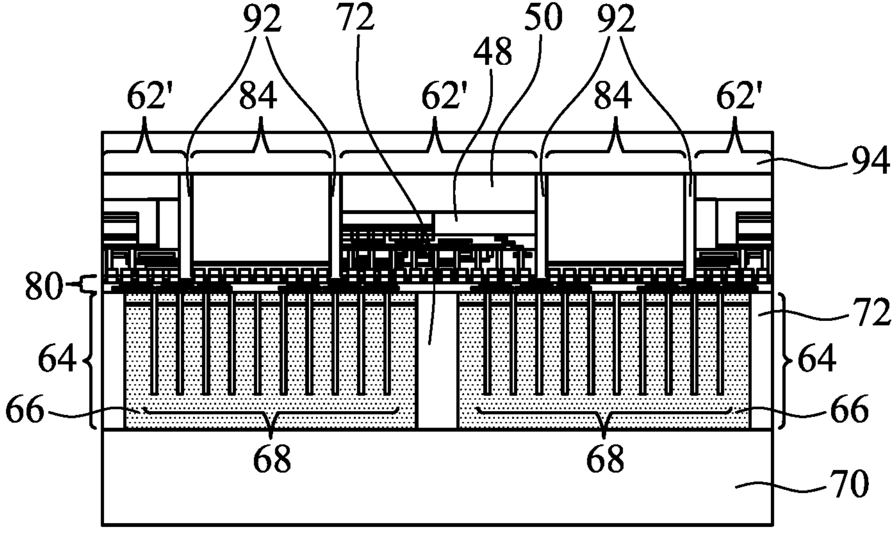
Figure 65:
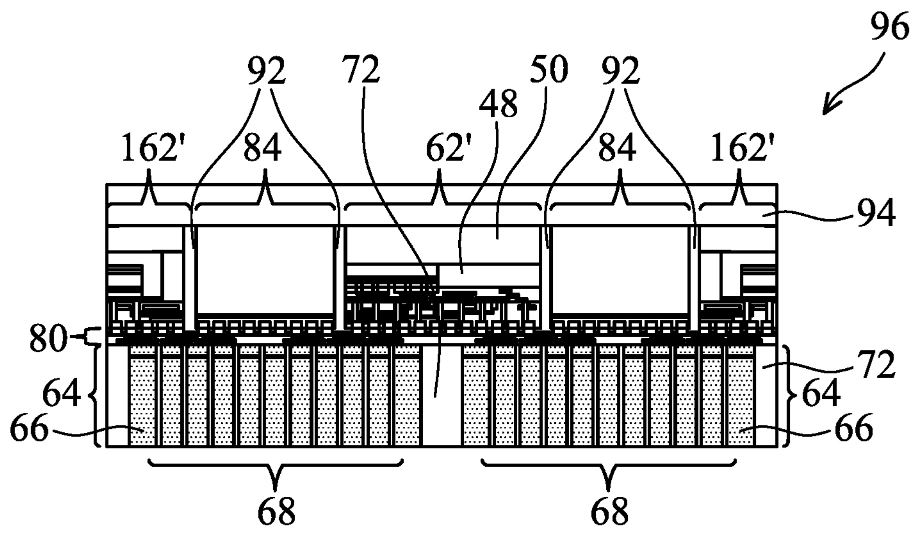
Figure 66:
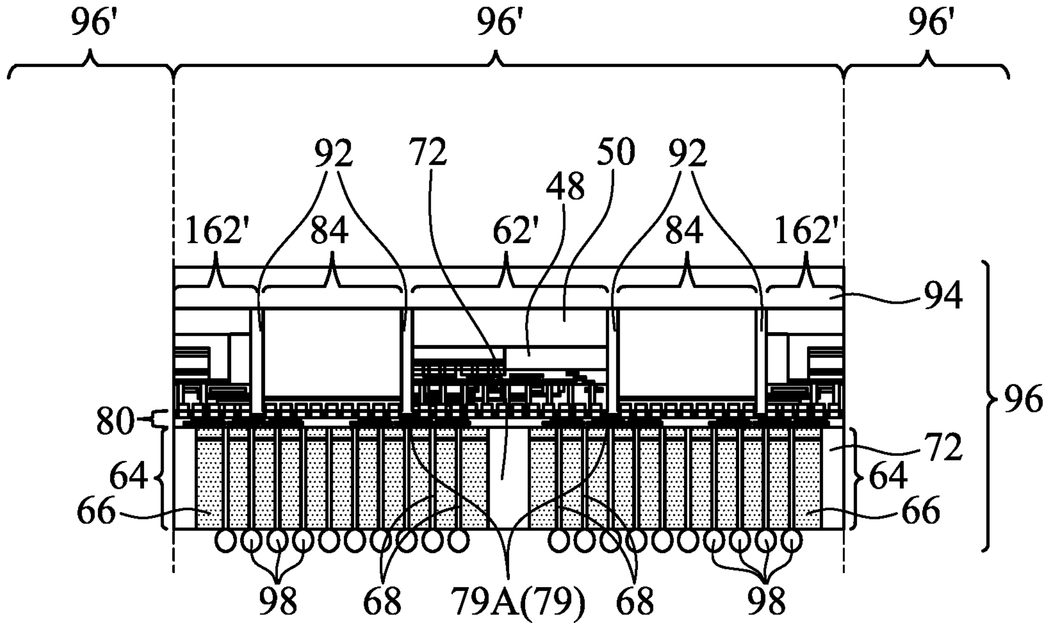
Figure 67:
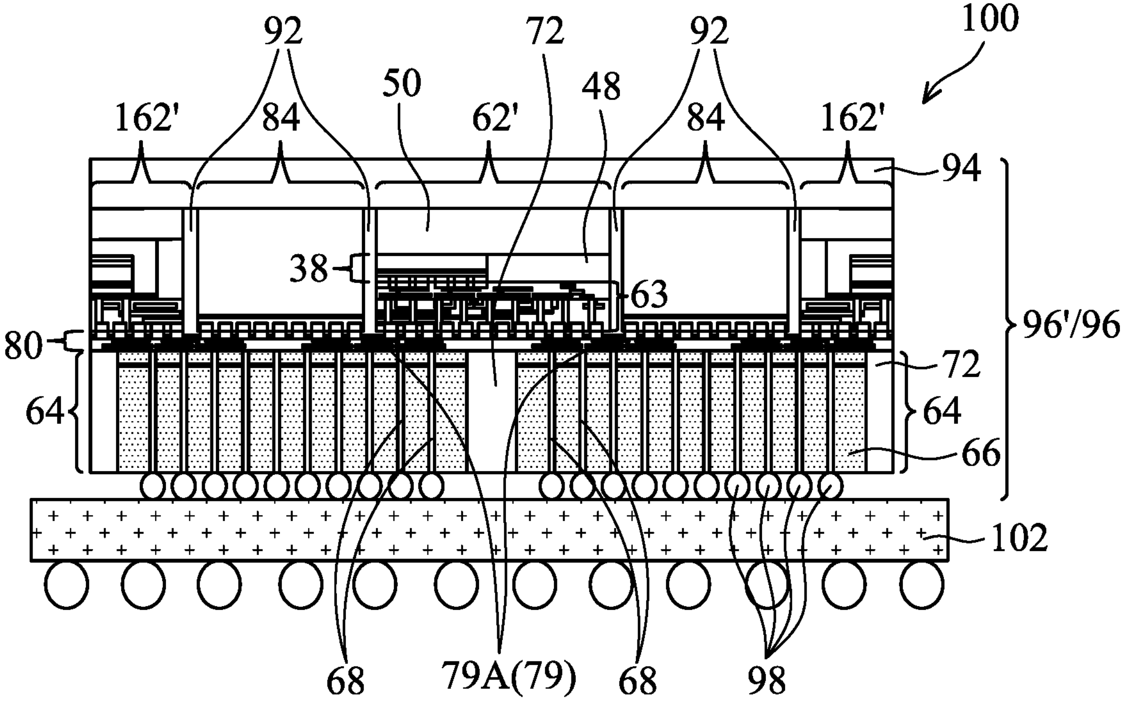

Referring to FIG. 63, gap-filling regions 92 are formed. FIG. 64 illustrates the bonding of supporting substrate 94. Next, carrier 70 is removed, followed by the backside grinding of semiconductor substrate 66, and the resulting structure is shown in FIG. 65. FIG. 66 illustrates the formation of electrical connectors 98. Reconstructed wafer 96 is formed, and may be (or may not be) sawed into discrete optical-engine based interconnect components 62'. FIG. 67 illustrates a cross-sectional view of package 100. In accordance with these embodiments, laser die 162' is built outside of optical-engine based interconnect component 62'.

Figures 68A, 68B, 68C:
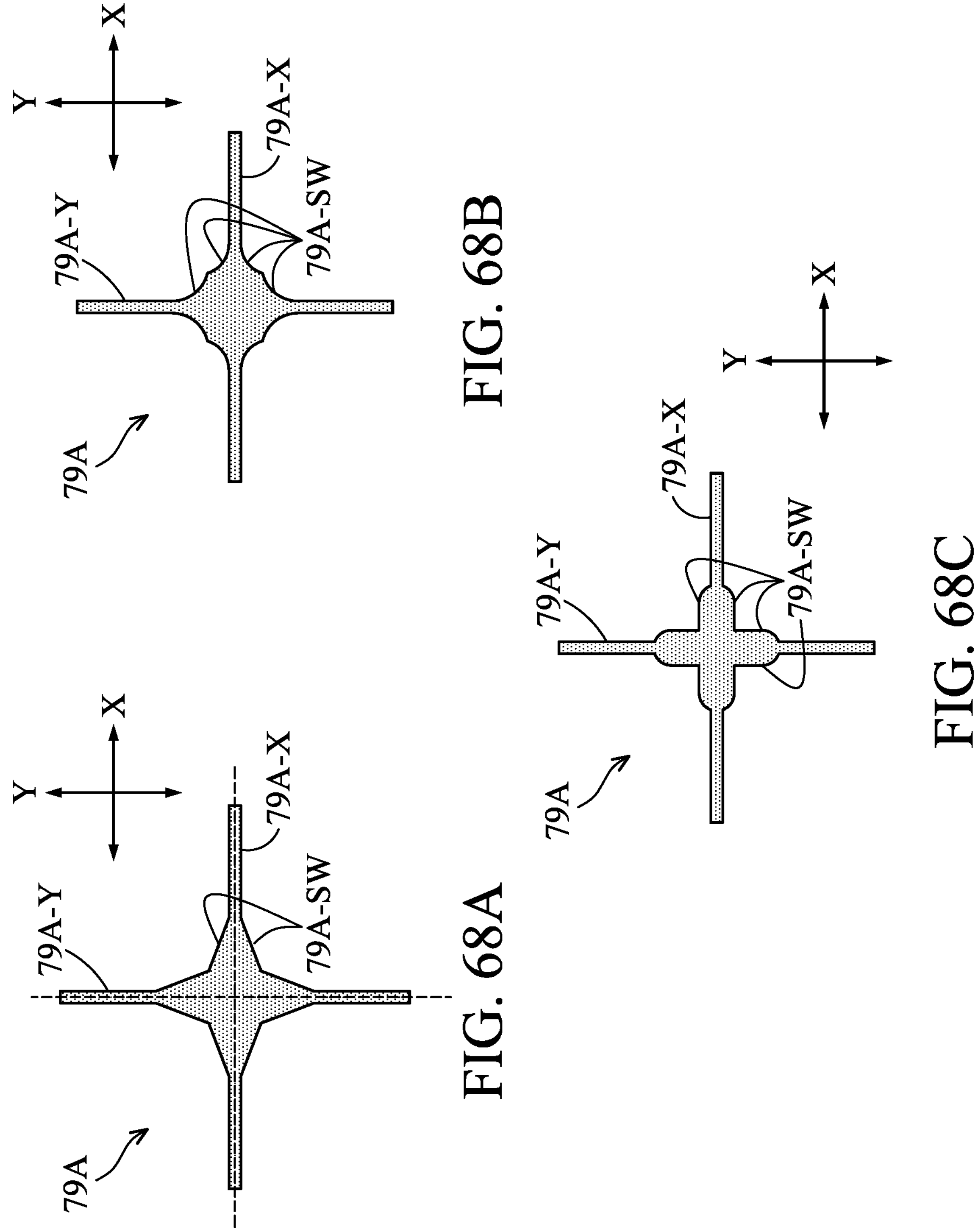
FIGS. 68A, 68B, and 68C illustrate the top views of some interconnect waveguides in accordance with some embodiments.

FIGS. 68A, 68B, and 68C illustrate some example waveguides 79A in accordance with some embodiments. Each waveguide 79A includes a portion 79A-X having a lengthwise direction extending in X-direction, and a portion 79A-Y having a lengthwise direction extending in Y-direction, which is perpendicular to the X-direction. Portions 79A-X and 79A-Y join with each other, so that the optical signals therein can be redistributed to both of X-direction and Y-direction. FIG. 68A illustrates a linear-tapered waveguide 79A, wherein sidewalls 79A-SW are straight in the top view. FIG. 68B illustrates a concave waveguide 79A, wherein sidewalls 79A-SW have concave shapes in the top view. FIG. 68C illustrates a convex waveguide 79A, wherein sidewalls 79A-SW have convex shapes in the top view.

The embodiments of the present disclosure have some advantageous features. By forming the optical-engine based interconnect components and using them to form electrical signal paths, the transferring speed and bandwidths of the transferred signals are significantly improved compared to the electrical signals transferred in metal electrical paths such as copper wires. Accordingly, the optical-engine based interconnect components may be used as high-speed and high-bandwidth electrical conductive lines to achieve ultra-fast signal transferring.

In accordance with some embodiments of the present disclosure, a method comprises encapsulating a first device die and a second device die in a first encapsulant; forming a first interconnect structure over and electrically connecting to the first device die and the second device die; forming a first waveguide in the first interconnect structure; and bonding an optical-engine based interconnect component to the first interconnect structure, wherein the optical-engine based interconnect component forms a part of a signal path that connects the first device die to the second device die. In an embodiment, the optical-engine based interconnect component is configured to receive an electrical signal from the first device die; convert the electrical signal to an optical signal; and convert the optical signal back to the electrical signal and to send to the second device die.

In an embodiment, the optical signal is transferred through the first waveguide. In an embodiment, the method further comprises bonding a supporting substrate over the optical-engine based interconnect component. In an embodiment, the supporting substrate comprises an optical lens. In an embodiment, the optical-engine based interconnect component comprises a photonic die and an electronic die bonded to the photonic die. In an embodiment, the method further comprises forming the optical-engine based interconnect component, wherein the optical-engine based interconnect component comprises a laser die therein.

In an embodiment, the method further comprises bonding a laser die to the first interconnect structure. In an embodiment, the package further comprises forming the optical-engine based interconnect component comprising patterning a semiconductor layer in a substrate to form a plurality of optical devices; forming a second interconnect structure over the plurality of optical devices; and bonding an electronic die to the second interconnect structure. In an embodiment, the optical-engine based interconnect component comprises both of silicon waveguides and nitride waveguides.

In accordance with some embodiments of the present disclosure, a package comprises a first device die; a second device die; and at least one optical-engine based interconnect component comprising an photonic die therein, wherein the at least one optical-engine based interconnect component is signally coupled between the first device die and the second device die, and wherein the at least one optical-engine based interconnect component is configured to receive an electrical signal from the first device die; convert the electrical signal to an optical signal; and convert the optical signal back to the electrical signal and to send to the second device die. In an embodiment, the package further comprises an interconnect structure over the first device die and the second device die, wherein the interconnect structure comprises dielectric layers, and waveguides in the dielectric layers.

In an embodiment, the at least one optical-engine based interconnect component is over and bonded to the interconnect structure. In an embodiment, the package further comprises a computing die over and bonded to the interconnect structure. In an embodiment, the at least one optical-engine based interconnect component comprises an electrical-to-optical signal converter; an optical-to-electrical signal converter; and a waveguide coupled between the electrical-to-optical signal converter and the optical-to-electrical signal converter. In an embodiment, the package further comprises a supporting substrate over and bonded to the at least one optical-engine based interconnect component. In an embodiment, the supporting substrate comprises an optical lens.

In accordance with some embodiments of the present disclosure, a package comprises a first device die; a second device die; an interconnect structure over the first device die and the second device die, wherein the interconnect structure comprises a plurality of dielectric layers; a plurality of redistribution lines in the plurality of dielectric layers; and a first waveguide in the plurality of dielectric layers; and an optical-engine based interconnect component over and bonded to the interconnect structure, the optical-engine based interconnect component comprising a photonic die comprising a second waveguide, wherein the first waveguide is optically coupled to the second waveguide.

In an embodiment, the interconnect structure and the optical-engine based interconnect component collectively comprises a signal path comprising an input connected to the first device die; an output connected to the second device die; and optical devices between the input and the output. In an embodiment, the package is configured to receive signals into the input and output the signals.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

encapsulating a first device die and a second device die in a first encapsulant;

forming a first interconnect structure over and electrically connecting to the first device die and the second device die;

forming a first waveguide in the first interconnect structure; and bonding an optical-engine based interconnect component to the first interconnect structure, wherein the optical-engine based interconnect component comprises:

an electronic die; and a photonic die bonded to the electronic die, wherein the photonic die comprises a plurality of waveguides, and wherein the electronic die and the photonic die collectively form a part of a signal path that connects the first device die to the second device die.

2. The method of claim 1, wherein the optical-engine based interconnect component is configured to:

receive an electrical signal from the first device die;

convert the electrical signal to an optical signal; and convert the optical signal back to the electrical signal and send the eletrical signal to the second device die.

3. The method of claim 2, wherein the optical signal is transferred through the first waveguide.

4. The method of claim 1 further comprising bonding a supporting substrate over the optical-engine based interconnect component, wherein edges of the supporting substrate are vertically aligned to respective edges of the optical-engine based interconnect component.

5. The method of claim 4, wherein the supporting substrate comprises an optical lens.

6. The method of claim 1 further comprising forming the optical-engine based interconnect component, wherein the optical-engine based interconnect component comprises a laser die therein.

7. The method of claim 1 further comprising bonding a laser die to the first interconnect structure.

8. The method of claim 1 further comprising forming the optical-engine based interconnect component comprising:

patterning a semiconductor layer in a substrate to form a plurality of optical devices;

forming a second interconnect structure over the plurality of optical devices; and bonding the electronic die to the second interconnect structure.

9. The method of claim 1, wherein the optical-engine based interconnect component comprises both of silicon waveguides and nitride waveguides.

10. The method of claim 1 further comprising forming the optical-engine based interconnect component comprising:

bonding the electronic die to the photonic die;

encapsulating the electronic die in a transparent gap-fill material; and performing a singulation process to saw the transparent gap-fill material and a photonic wafer that comprises the photonic die.

11. A package comprising:

a first device die;

a second device die; and at least one optical-engine based interconnect component comprising a photonic die therein, wherein the at least one optical-engine based interconnect component is signally coupled between the first device die and the second device die, and wherein the at least one optical-engine based interconnect component is configured to:

receive an electrical signal from the first device die;

convert the electrical signal to an optical signal;

transferring the optical signal through a waveguide, wherein in a top view of the package, the waveguide has a cross shape including a first portion and a second portion in first directions that are opposite to each other, and a third portion and a fourth portion in second directions that are opposite to each other and perpendicular to the first directions; and convert the optical signal received from the first portion of the waveguide back to the electrical signal and send the electrical signal to the second device die.

12. The package of claim 11 further comprising:

an interconnect structure over the first device die and the second device die, wherein the interconnect structure comprises dielectric layers, and waveguides in the dielectric layers.

13. The package of claim 12, wherein the at least one optical-engine based interconnect component is over and bonded to the interconnect structure.

14. The package of claim 12 further comprising a computing die over and bonded to the interconnect structure.

15. The package of claim 11, wherein the at least one optical-engine based interconnect component comprises:

an electrical-to-optical signal converter;

an optical-to-electrical signal converter; and an additional waveguide coupled between the electrical-to-optical signal converter and the optical-to-electrical signal converter.

16. The package of claim 11 further comprising a supporting substrate over and bonded to the at least one optical-engine based interconnect component.

17. The package of claim 16, wherein the supporting substrate comprises an optical lens.

18. A package comprising:

a first device die;

a second device die;

an interconnect structure over the first device die and the second device die, wherein the interconnect structure comprises:

a plurality of dielectric layers;

a plurality of redistribution lines in the plurality of dielectric layers; and a first waveguide in the plurality of dielectric layers; and an optical-engine based interconnect component over and bonded to the interconnect structure, the optical-engine based interconnect component comprising:

a photonic die comprising a second waveguide, wherein the first waveguide is optically coupled to the second waveguide;

an electronic die bonded to the photonic die through bond pads; and a transparent gap-fill material encapsulating the electronic die therein, wherein a first sidewall of the photonic die is vertically aligned to a second sidewall of the electronic die, and a third sidewall of the photonic die is vertically aligned to a fourth sidewall of the transparent gap-fill material.

19. The package of claim 18, wherein the interconnect structure and the optical-engine based interconnect component collectively comprise a signal path comprising:

an input connected to the first device die;

an output connected to the second device die; and optical devices between the input and the output.

20. The package of claim 19, wherein the package is configured to receive signals into the input and output the signals.

* * * * *